United States Patent
Jain et al.

(10) Patent No.: US 11,609,956 B2
(45) Date of Patent: Mar. 21, 2023

(54) EXTENSIBLE FRAMEWORK FOR EXECUTABLE ANNOTATIONS IN ELECTRONIC CONTENT

(71) Applicant: Microsoft Technology Licensing, LLC, Redmond, WA (US)

(72) Inventors: Mitali Jain, Hyderabad (IN); Praveen Upadhyay, Hyderabad (IN); Mahesh Sridharan, Hyderabad (IN); Rajiv Kumar, Hyderabad (IN); Sanjib Biswas, Hyderabad (IN); Arun Rajappa, Hyderabad (IN); Sunny Mitra, Hyderabad (IN); Aloka Sanjib Kumar Mitra, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/367,604

(22) Filed: Jul. 5, 2021

(65) Prior Publication Data
US 2021/0334310 A1 Oct. 28, 2021

Related U.S. Application Data

(63) Continuation of application No. 16/241,870, filed on Jan. 7, 2019, now Pat. No. 11,055,361.

(51) Int. Cl.
*G06F 16/90* (2019.01)
*G06F 16/907* (2019.01)
(Continued)

(52) U.S. Cl.
CPC .......... *G06F 16/907* (2019.01); *G06F 3/0482* (2013.01); *G06F 16/904* (2019.01); *G06Q 20/38* (2013.01)

(58) Field of Classification Search
CPC ..... G06F 16/907; G06F 16/904; G06F 3/0482
See application file for complete search history.

(56) References Cited

U.S. PATENT DOCUMENTS 7,154,621 B2 * 12/2006 Rodriguez ......... H04N 1/00148
358/1.15
10,361,892 B2 * 7/2019 Mu ........................... H03F 1/02
(Continued)

OTHER PUBLICATIONS

"Office Action Issued in Indian Patent Application No. 202147028965", dated Jan. 3, 2023, 9 Pages.

*Primary Examiner* — Eliyah S. Harper
(74) *Attorney, Agent, or Firm* — NovoTechIP International PLLC

(57) ABSTRACT

Techniques for annotating electronic content items include receiving over a communication network a first request to associate a first tag from among a plurality different of tags with first electronic content, wherein each tag from among the plurality of tags is: configured to label electronic content, and associated with a respective task from among a plurality of tasks; recording, in response to receiving the first request, a first association between the first electronic content and the first tag; and transmitting over the communication network to a first recipient client: the first electronic content, and an instruction to the first recipient client to cause the first recipient client to execute, in response to receiving the first electronic content, the respective task associated with the first tag on the first electronic content.

20 Claims, 20 Drawing Sheets

(51) Int. Cl.
    *G06F 16/904*     (2019.01)
    *G06F 3/0482*     (2013.01)
    *G06Q 20/38*     (2012.01)

(56)             References Cited

U.S. PATENT DOCUMENTS

| | | | |
|---|---|---|---|
| 10,528,631 B1* | 1/2020 | Nordhagen | G06F 16/9535 |
| 2004/0054670 A1* | 3/2004 | Noff | G06F 16/80 |
| 2004/0261032 A1* | 12/2004 | Olander | G06F 3/0482 |
| | | | 715/744 |
| 2008/0162205 A1* | 7/2008 | Gross | G06F 16/9024 |
| | | | 345/440 |
| 2008/0162207 A1* | 7/2008 | Gross | G06F 16/904 |
| | | | 703/2 |
| 2008/0201418 A1* | 8/2008 | Krishnan | G06F 16/95 |
| | | | 709/204 |
| 2012/0143857 A1* | 6/2012 | Gronow | G06F 16/54 |
| | | | 707/723 |
| 2012/0151404 A1* | 6/2012 | Nazmus | G06F 3/0482 |
| | | | 715/780 |
| 2013/0321340 A1* | 12/2013 | Seo | G06F 3/04883 |
| | | | 345/174 |
| 2014/0075004 A1* | 3/2014 | Van Dusen | G06Q 50/01 |
| | | | 709/223 |
| 2015/0381744 A1* | 12/2015 | Na | H04L 67/51 |
| | | | 709/203 |
| 2017/0168774 A1* | 6/2017 | Sugita | G06F 3/0481 |
| 2017/0262437 A1* | 9/2017 | Raichelgauz | G06F 16/951 |

* cited by examiner

EXTENSIBLE FRAMEWORK FOR EXECUTABLE ANNOTATIONS IN ELECTRONIC CONTENT

CROSS-REFERENCE TO RELATED APPLICATION

This application is a continuation of and claims priority under 35 U.S.C. § 120 to U.S. patent application Ser. No. 16/241,870, filed on Jan. 7, 2019 and entitled "Extensible Framework for Executable Annotations in Electronic Content," the entirety of which is incorporated by reference herein in its entirety.

BACKGROUND

Computing devices that include cameras and multimedia content support applications have become increasingly common in mobile devices, including laptop computers, tablets, digital cameras, smartphones, as well as other mobile data, messaging, and/or communication devices. Generally, users make use of cameras associated with computing devices to take various pictures, such as images of scenery, persons, presentations, whiteboards, business cards, documents, sketches, paintings, and so forth. The users can refer to the captured images to recall information contained therein (e.g., diagrams, pictures, lists and other text) and/or to electronically deliver them to other users, storage services, or devices.

Multimedia content is typically shared among mobile users through multimedia messaging services (MMS), and multimedia content is shared between Internet users and mobile users via email. However, the sharing of multimedia content stored in the device (e.g., photos, video clips, audio clips, data, etc.) with friends, colleagues and other family members remains relatively nuanced and cumbersome. Users may have specific intentions associated with the sharing of the content that are lost during the transmission, or that require a time-intensive effort to convey. Thus, there remain significant areas for new and improved ideas for the efficient and meaningful sharing of electronic content, as well as management of the type of responses that are desired from the recipients.

SUMMARY

An example data processing system according to the disclosure includes: at least one processor; and one or more computer readable media including instructions which, when executed by the at least one processor, cause the at least one processor to: receive over a communication network a first request to associate a first tag of a plurality of different tags with first electronic content, wherein each tag of the plurality of tags is: configured to label electronic content, and associated with a respective task from among a plurality of tasks; record, in response to receiving the first request, a first association between the first electronic content and the first tag; and transmit over the communication network to a first recipient client: the first electronic content, and an instruction to the first recipient client to cause the first recipient client to execute, in response to receiving the first electronic content, the respective task associated with the first tag on the first electronic content.

An example method for annotating electronic content items according to the disclosure includes receiving over a communication network a first request to associate a first tag from among a plurality different of tags with first electronic content, wherein each tag from among the plurality of tags is: configured to label electronic content, and associated with a respective task from among a plurality of tasks; recording, in response to receiving the first request, a first association between the first electronic content and the first tag; and transmitting over the communication network to a first recipient client: the first electronic content, and an instruction to the first recipient client to cause the first recipient client to execute, in response to receiving the first electronic content, the respective task associated with the first tag on the first electronic content.

An example computer-readable storage medium according to the disclosure on which are stored instructions that, when executed, cause a processor of a programmable device to perform operations of: receiving over a communication network a first request to associate a first tag from among a plurality of different tags with first electronic content, wherein each tag from among the plurality of tags is: configured to label electronic content, and associated with a respective task of a plurality of different tasks; recording, in response to receiving the first request, an association between the first electronic content and the first tag; and transmitting over the communication network to a first recipient client: the first electronic content, and an instruction to the first recipient client to cause the first recipient client to execute, in response to receiving the first electronic content, the respective task associated with the first tag on the first electronic content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
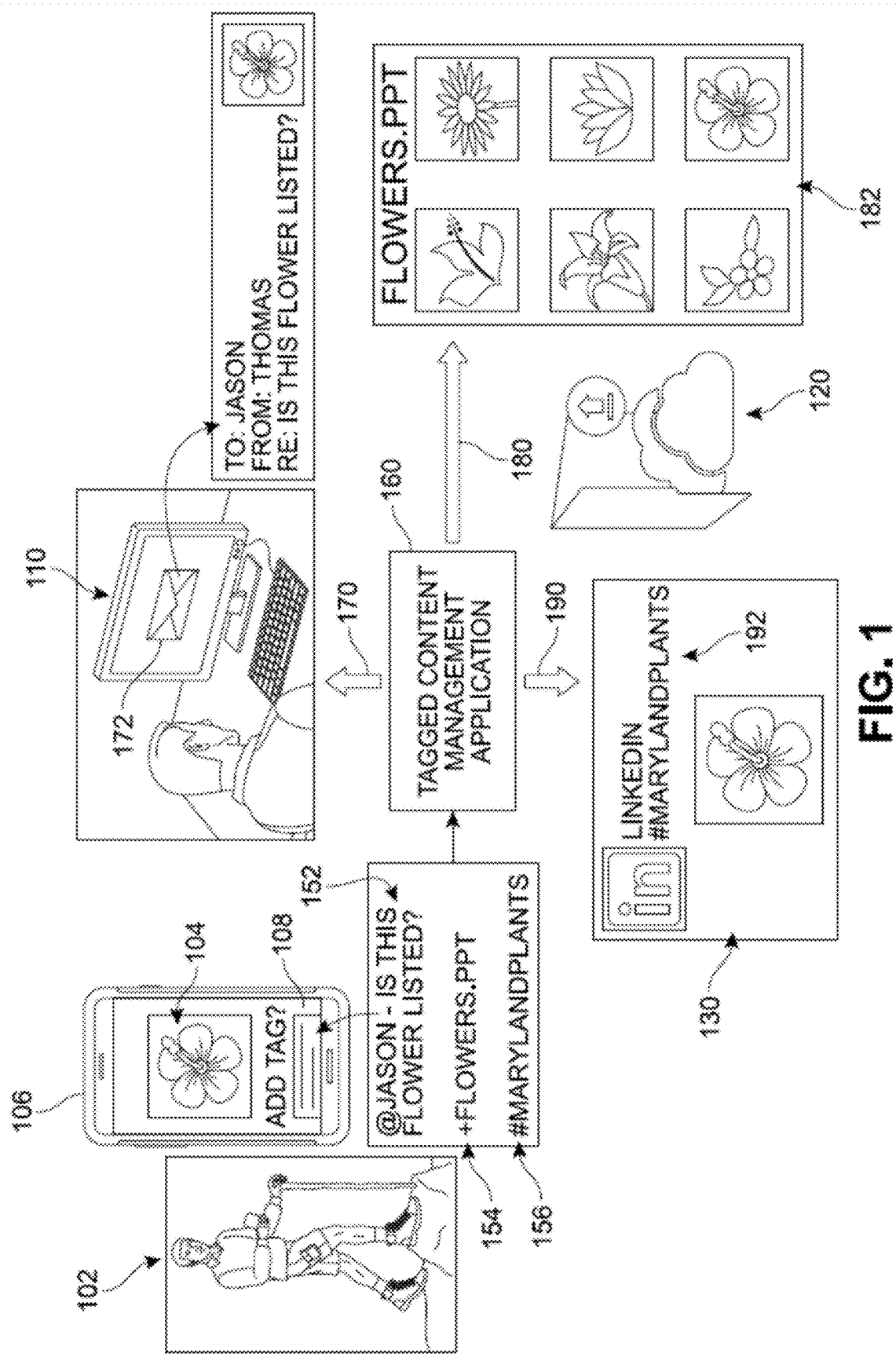
FIG. 1 illustrates an implementation of an image sharing and annotating application and environment.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following implementations introduce a scan application toolbox configured to enhance user content sharing experiences by permitting a user to add an executable label or annotation to the content prior to sharing. Traditionally, content sharing workflows have included a series of cumbersome steps as a user attempts to share their electronic content with a specific intent of the mechanism by which it should be conveyed or to whom or a desire that further action to be taken or initiated by the recipient. The sender typically must (1) identify the item; (2) insert the item into an application for sharing; (3) add some note or message that indicates the response or result desired by the receiver of the shared item; (4) hope that the receiver understands the request and takes the steps necessary to respond appropriately. Such notes often remain embedded or visibly printed onto or alongside the electronic content, which may not be the preferred outcome for the sender, who added the annotation to ensure the receiver acted on the information as requested. The disclosed implementations allow a user to add an executable command or instructions in the form of an annotation to the electronic content, such that the receiver can benefit from a more precise and detailed context as they interpret and/or act on the sender's request. In some implementations, the system can be configured to 'translate' or convert the annotation upon detection of a predefined trigger and perform one or more tasks that will facilitate the receiver's access to and interaction with the item. The sender enjoys a much finer control over the manner, presentation, and overall context of the electronic content item as it is shared, enabling them to offer the receiver a more precise understanding of their intentions in sharing the item. Similarly, a receiver can be guided toward actions or responses that are expected or desired by the sender of the electronic content item, while also finding that the process of responding or engaging with the item greatly simplified.

As introduced above, applications such as word processors, publishers, spreadsheets, presentation software, and others can be used to generate electronic documents or content. Generally, the term "electronic document" or "document" includes any data that may be presented (e.g., visually, audibly, tactile-based, etc. presented), including but not limited to an electronic content item and portions thereof, a media item, a media stream, a web page, a hypertext document, an image, digital video or a video recording, digital audio or an audio recording, animation, a markup language document, such as a HyperText Markup Language (HTML) or eXtensible Markup Language (XML) document, a form having blank components to accept entered data, or data describing the application of a GUI, image documents that include images of text that may be extracted using optical character recognition (OCR) processes, documents that may include mixtures of text and images, such as Portable Document Format (PDF) documents or PowerPoint (PPT) documents, etc., or any type or format of document from which text may be extracted or that may be converted to text, and other digital data. As an example, the electronic content may include word processing documents, spreadsheets, presentations, e-books, images, slides, photographs, or other digital-based media.

In addition, a user or participant generally refers to one who views, creates, captures, modifies, develops, collaborates, suggests, listens, receives, shares, reviews, revises, or disseminates pieces of electronic content, including the creation, viewing, or updating of annotations associated with the electronic content. A user includes a creator or sharer of electronic content and electronic content-based programs, as well as a user of the apparatus and systems described herein. Furthermore, the term "software application", "software", or "application" refers to a computer program that performs useful work, generally unrelated to the computer itself. Some non-limiting examples of software applications include speech-to-text applications, image capture applications, recording applications, word processors, spreadsheets, slideshows, and presentation design applications, accounting systems, and telecommunication programs, as well as gaming software, utility and productivity tools, mobile applications, presentation graphics, and other electronic content creation or sharing software.

In different implementations, software applications such as programs offered in the Microsoft Office Suite® (e.g., Word®, Powerpoint®, Excel®, Visio®, Skype®, Teams®, OneNote®), Office 365®, Microsoft 365®, Microsoft Pix®, Microsoft Office Lens® and other suites or applications can offer a variety of teleconferencing, text generation, presentation, and image capture or commenting tools. In other implementations, Adobe Photoshop®, Google Slides®, or another image capture or data presentation program, such as Clear Scanner®, Adobe Scan®, CamScanner®, Apple Pages®, Corel WordPerfect®, Google Docs®, IBM Lotus Word Pro® or other software applications within the Microsoft Office Suite® or array of Microsoft® products as well as any non-Microsoft® based applications may be used. These are non-limiting examples, and any other electronic content creation, editing, or collaboration application may benefit from the disclosed implementations. Throughout this description, the software application that is used to originally create or normally view (e.g., on a desktop) the electronic content will be referred to as the native application.

In some implementations, various image sharing and scanning applications permit end-users to scan documents, presentations, real-world objects, and other subjects using images captured by a camera associated with the device or via images stored or accessed from memory. In different implementations, software applications such as programs offered in the Microsoft Office Suite® (e.g., Office Lens®, Powerpoint®, Visio®) and other applications can offer a variety of image capturing and editing tools, including scanning and identification of different regions in an image. Other examples include Microsoft Safety Scanner®, VueScan®, Picasa®, TWAIN®, Windows Fax and Scan®, PaperPort®, SilverFast®, Genius Scan®, TurboScan®, Scanner Pro®, Prizmo®, Google PhotoScans® and Helmut Film Scanner®, Google Drive®, Evernote Scannable®, Dropbox®, Scanbot®, CamScanner®, Photomyne®; these are non-limiting examples, and any other electronic content editing or viewing application may benefit from the disclosed implementations.

The software application that may incorporate the disclosed features can be installed on a client's device, or be associated with a third-party application, such as a web-browser application that is configured to communicate with the device. These devices can include, for example, desktop computers, mobile computers, mobile communications devices (such as mobile phones, smart phones, tablets, etc.), smart televisions, gaming devices, set-top boxes, and/or any other computing devices that include a camera and/or an image-display capability.

Figure 2:
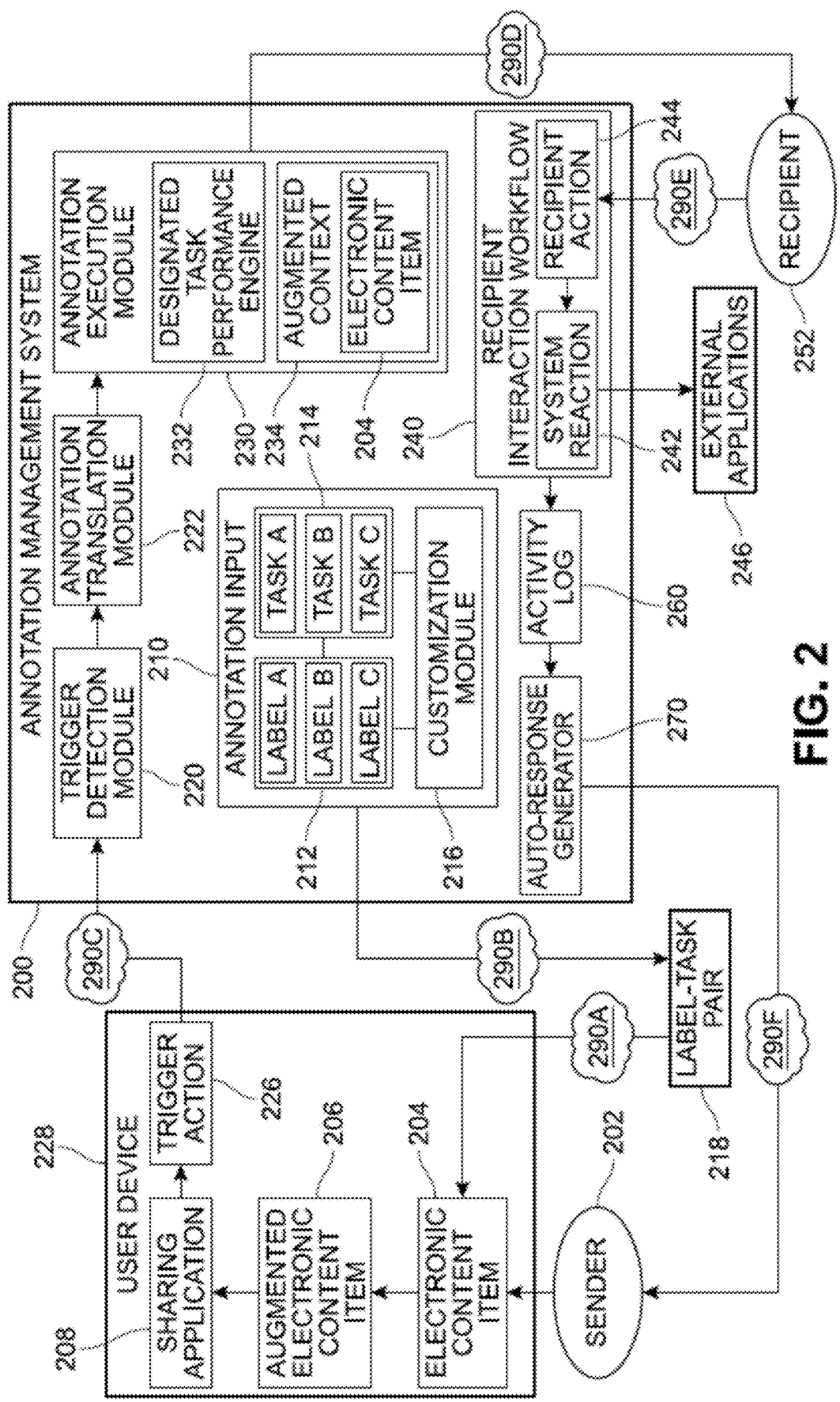
FIG. 2 is a conceptual diagram illustrating one implementation of a distributed computing environment for enabling executable annotations with electronic content items.

In order to better introduce the systems and methods to the reader, FIG. 1 presents an example of a representative electronic content sharing environment for implementing an executable tagging or annotation feature (the system is illustrated schematically in greater detail in FIG. 2). In different implementations, the environment can include a plurality of computing device end-users, or simply "users" who can capture, view, edit, modify, and/or interact with the electronic content (for example a first user, a second user, a third user, etc.). For purposes of simplicity, in the following scenarios a user who is responsible for adding, attaching, linking, inserting, or otherwise associating an executable annotation to an electronic content item will be referred to as a sender, and users, groups, or entities who receive or are otherwise affected by the annotated electronic content and/or any manifestation of the executed annotation will be referred to as recipients. Thus, a recipient need not be limited to persons or individual communication addresses or contact points, but may be understood to more broadly encompass any sharepoint, including e-mail accounts, instant message communications, text messages, messages transmitted via teleconferencing applications, social media pages for individuals and/or groups, collaborative applications, websites or organizational sites, cloud or network storage, or any other mechanism by which the electronic content may be forwarded, shared, moved, or uploaded from a first digital location to a second digital location. In some implementations, transmission of a file or moving of the file from one location to another can be configured to trigger execution of the instructions carried by the annotation.

As will be described in further detail below, an executable annotation can be understood to refer to any virtual note, label, tag, or information that is distinct to the data comprising the electronic content item itself and is paired with or otherwise includes executable instructions or code for performing one or more tasks. Executable instructions can be configured to cause a computing or other processing device to perform a certain function or group of functions. In some implementations, the executable instructions can be executed by a computing system that is associated with a sender and/or target recipient, while in other implementations the executable instructions can be executed via a cloud computing system or network.

As an example, a sender 102, a first recipient 110, a second recipient 120, and a third recipient 130 are depicted in FIG. 1. In this case, the sender 102 is accessing an electronic content item (here, an image 104) on a mobile computing device 106 that is linked via a network to other end-users, data repositories, and entities. As the user views the image 104, he or she can add or otherwise associate one or more executable annotations to the image 104. For purposes of simplicity, the term 'tag' may be used interchangeably with the term 'executable annotation' and the act of 'tagging' will also refer to the process of associating an executable annotation with an electronic content item.

In some implementations, the selection of a tag can occur via a user interface 108 presented on a display. In general, an "interface" can be understood to refer to a mechanism for communicating content through a client application to an application user. For example, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. Furthermore, an "actuation" or "actuation event" refers to an event (or specific sequence of events) associated with a particular input or use of an application via an interface, which can trigger a change in the display of the application.

In addition, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. Thus, as non-limiting examples, an asset may include text in an actuatable pop-up window, audio associated with the interactive click of a button or other native application object, video associated with a teaching user interface, or other such information presentation.

In the example of FIG. 1, the sender 102 has selected and/or created three different tags, including a first tag 152, a second tag 154, and a third tag 156. In different implementations, a tag may contain, include, or convey tag content. As one example, the tag content of the first tag 152 includes an 'at' mention to an individual user account as well as a note ("@Jason—Is this flower listed?"). In some implementations, the format and/or use of a specific symbol or character can determine or define the dynamics for a particular task that will be performed when the tag is executed. For example, the use of an "A" followed by an identifier can indicate that the electronic content item should be shared with the named user in a particular way. In addition, the use of a dash "-" (or other symbols, such as a colon, comma, quotes, hash, etc.) can indicate that the text that follows the colon should be presented as a message to the named user. These details are shown for purposes of illustration only, and it should be understood that a wide range of other tag content can represent or serve to convey different types of instructions.

The tag content for the second tag 154 includes a plus sign ("+") followed by a file name (here "Flowers.PPT", where the powerpoint file extension suggests the file is a slideshow). In this example, the plus sign can indicate a request that the image 104 be shared or otherwise added to the named file. Again, this usage is for purposes of illustration only, and the particular formatting or type of characters used to express any instructions can vary. In a third example, the tag content for the third tag 156 includes "#Maryland-Plants", indicating a request by the user for the image to be shared on a social media webpage linked to the Maryland-Plants identifier.

It can be understood that each tag has been inserted or associated with the image 104. In different implementations, once a tag has been associated with an electronic content item and the tagged electronic content item is shared or otherwise moved, the system can be configured to execute the instructions paired with or contained within the selected tag. A user may, in some implementations, access or otherwise manage the tagged image 104 via a first application. It can be appreciated that while execution of the task(s) associated with the tag can be triggered during use of the first application (e.g., the user takes some action relative to the image 104 that triggers the executable instructions), the executed task may also occur via the first application and/or through the resources of a second, different application. In other words, the tag can be configured to perform a wide range of task types across a variety of platforms. Thus, the task requested by the insertion of the tag need not be limited in scope to what the first application is capable of, but can extend across multiple applications and functionalities.

In FIG. 1, for purposes of simplicity, the sender 102 submits or uploads the tagged image to an executable annotated content manager application ("manager application") 160 that is configured to access a cloud-based annotation system via a network connection. In other implementations, the manager application 160 may be optional, and its functions carried out by the software that is used to create, modify, view and/or share the electronic content item, or a user may directly access the system online as a cloud-based application. Upon detecting and/or identifying a submission of tagged content, the manager application 160 can be configured to process any tags and/or to forward the tagged image to another module or application for execution or presentation. In this case, the manager application 160 identifies and classifies each tag. Depending on the type of tag and its corresponding task, the manager application 160 can route the tagged content to the appropriate outlet or executing application.

In a first scenario 170, upon execution of the first tag 152, the image 104 has been transmitted in a message 172 to an e-mail inbox for the first recipient 110, where the message subject line includes the same text of the note "Is this flower listed?" In a second scenario 180, upon execution of the second tag 154, the image 104 has been added to and embedded in the file "Flowers.PPT" 182, where the selected file may be understood to serve as the second recipient 120. In a third scenario 190, the image 104 has been posted to the designated third recipient 130, here a social media page 192. Thus, it can be appreciated that in different implementations, each tag can be paired with a distinctly different task. When the instructions are executed for each of these tags, multiple processes are initiated across several applications. In addition, in some implementations, some or all of the steps comprising these tasks are performed automatically, without further user intervention or inputs. It may be appreciated that this type of system can offer users an improved experience as they create and share content across multiple distribution paths.

Referring now to FIG. 2, an example of a representative architecture for a content annotation and sharing management system ("system") 200 are depicted. In different implementations, the proposed systems can include provisions for applying a variety of annotation-task pair types to electronic content and/or presenting various user interfaces for tag customization. In some implementations, the user experience of inserting an annotation may be relatively straightforward. In FIG. 2, an example of a system that is configured to manage the use of executable annotations is illustrated. It is to be understood that the system 200 presented here is merely an example implementation, only some aspects are presented for purposes of clarity, and that a wide variety of other implementations are possible.

While the system 200 can be installed locally on a client device, in other implementations, as shown herein, the system 200 is stored and/or configured for access via a network and/or cloud-based computing service. In FIG. 2, it can be seen that the system 200 includes an annotation input component 210. The annotation input component 210 is configured to store, update, and provide or enable access to the plurality of annotation options available for insertion or association with an electronic content item. As an example, the annotation input component 210 can include a set of labels 212 (e.g., Label A, Label B, Label C, etc.) that may be selected for linking or pairing with one or more specific corresponding tasks 214 (e.g., Task A, Task B, Task C, etc.). In some implementations, pairings can be established as a default by the system; for example, there can be pairings that are specific to and are expected to be commonly used by particular user-types such as businesses, vendors, social media, families, individuals, professional or personal networks, travel, blogs, schools, or other groups. In other implementations, such pairings can occur as a result of customized user-designated or created label-task connections, via a customization module 216.

A sender 202 accesses an electronic content item 204 via any type of device 228 capable of presenting images and/or digital content, such as cameras, mobile phones, tablets, laptops, desktops, gaming devices, projectors, and other such devices. Furthermore, software such as a content-sharing application can be locally installed on the device, or some or all aspects or features of the application may be accessed from another device or accessed from cloud storage computing services.

In different implementations, the device 228 can access, store, or receive electronic content item 204 for the sender 202 to view and annotate on a user device 228. In some implementations, the sender 202 can attach or associate at least one label-task pair 218 to the electronic content item 204 to produce an augmented electronic content item 206. The term augmented in this case can be understood to refer to the result when a core content item (e.g., electronic content item 204) is associated with added features, content, attributes, or services such as a tag. The additional features confer on the item a framework that is registered during the sharing process. As one example, the sender 202 can access label-task pair(s) from an online repository 290a, and the label-task pair 218 can be updated or otherwise modified via a network connection 290b to the system 200.

The user inputs can vary widely based on the type of input means used. In FIG. 2, the user input can be understood to be associated or correspond with some usage of a sharing application 208, including but not limited to telecommunication software, storage synchronization services, social media platforms, and other such mechanisms for sharing content between one location and another. As one example, the user input can include a touch on a touch-screen interface or a mouse-click designating a target recipient or location that is desired by the user for sharing of the electronic content item 204.

In some implementations, the user input can also be identified as a trigger action event 226 by a trigger detection module 220 of the annotation management system 200. Generally, a "trigger event" or "trigger" refers to an event (or specific sequence of events) associated with a particular use of an application, which corresponds to a selection of an option offered via a native control, or an event that matches a condition. In FIG. 2, the triggering event may be understood to include a 'click', toggle, voice command, or other input actions (such as a mouse left-button or right-button click, a touchscreen tap, a selection of data, or other input types) that leads to a sharing of the electronic content item 204 or an activation of the augmented electronic content item 206. It can be seen that while the trigger action event 226 occurs through a user device 228, the occurrence of the event may be transmitted by a network connection 290c with the system 200.

Once a trigger is detected, the augmentation layer or layer of content corresponding to the annotation that was added to the electronic content item 204 can be processed by an annotation translation module 222, which can be configured to interpret the instructions conveyed by the annotation and determine the manner in which the instructions are to be executed. This information can then be provided to an annotation execution module 230, which initiates execution via a designated task performance engine 232, and produces an outcome that is aligned with the sender's request; examples of this process are presented with reference to FIGS. 3-11 below. For example, the annotation translation module 222 can allocate a display area in the client device display, inside of which a contextual layer can create user interface (UI) controls. The annotation translation module 222 can execute instructions that render the contextual layer in the appropriate display area and adapt the manifestation of the task to the content of the contextual layer. The display area that is allocated depends on the layer's display mode. In one embodiment, a layer cannot modify the size of its display area, move the display area, or create UI elements outside of the display area. In another embodiment, a layer can request the properties of its display environment (e.g., display mode, display area size, display area location, and pinning status) and/or be notified of any changes.

In some implementations, the outcome can include the transmission of the electronic content item 204 within or alongside an augmented context 234. In other words, the result of the execution of the instructions can include the presentation or delivery of the electronic content item 204 to a recipient 252 (e.g., via a network connection 290d) with a secondary layer of content that corresponds to the manner and/or mechanism by which the sender 202 requested the content should be manifested for the recipient 252.

Furthermore, in different implementations, the annotation management system 200 can be configured to guide or assist in the execution of additional actions stemming from the delivery of the augmented context 234. For example, in response to various interaction events by the recipient 252 (e.g., via a network connection 290e) with the received content, the system can manage subsequent actions. As a general matter, an "interaction event" as used herein refers to an event (or specific sequence of events) associated with a particular use or access of an electronic content or application, which may then be used to determine whether the additional actions should occur.

In FIG. 2, the recipient action 244 can be evaluated by a recipient interaction workflow module 240. Depending on the type of action that occurs, the system can generate a reaction 242 that may communicate with external applications 246 and/or result in the system recording the action in an activity log 260. Such information can be used to notify the sender 202 (e.g., via a network connection 290f) of the status of the executed annotation in some implementations, for example, via an auto-response generator 270.

As a general matter, a contextual layer generated by the annotation is executed as an extensible framework that may include the following features: (a) An XML file format for packaging a layer's HTML, JavaScript, and application descriptor into a single file. The application descriptor indicates which types of electronic content the layer is applicable to; (b) A service that renders a layer XML file into HTML/JavaScript that can be displayed in a web browser; (c) Client-side JavaScript for existing web applications (e.g., electronic content processing modules) to instantiate layers and display them inside a container element. The JavaScript creates sandboxed iframe HTML elements for each layer. The iframes use uniform resource locators (URLs) that point back to the service to render the requested layer; (d) Client-side JavaScript for a remote procedure call (RPC) framework that enables applications to register JavaScript methods (the Layer API) that the layers can call from their sandboxed iframes. This enables layers to call back into the application and send/receive data. Furthermore, there may be provisions for execution of the instructions while preventing the contextual layer from interfering with the operation of the electronic content presentation. In some implementations, the annotation can indicate in its application descriptor which features it requires to execute.

Figure 3:
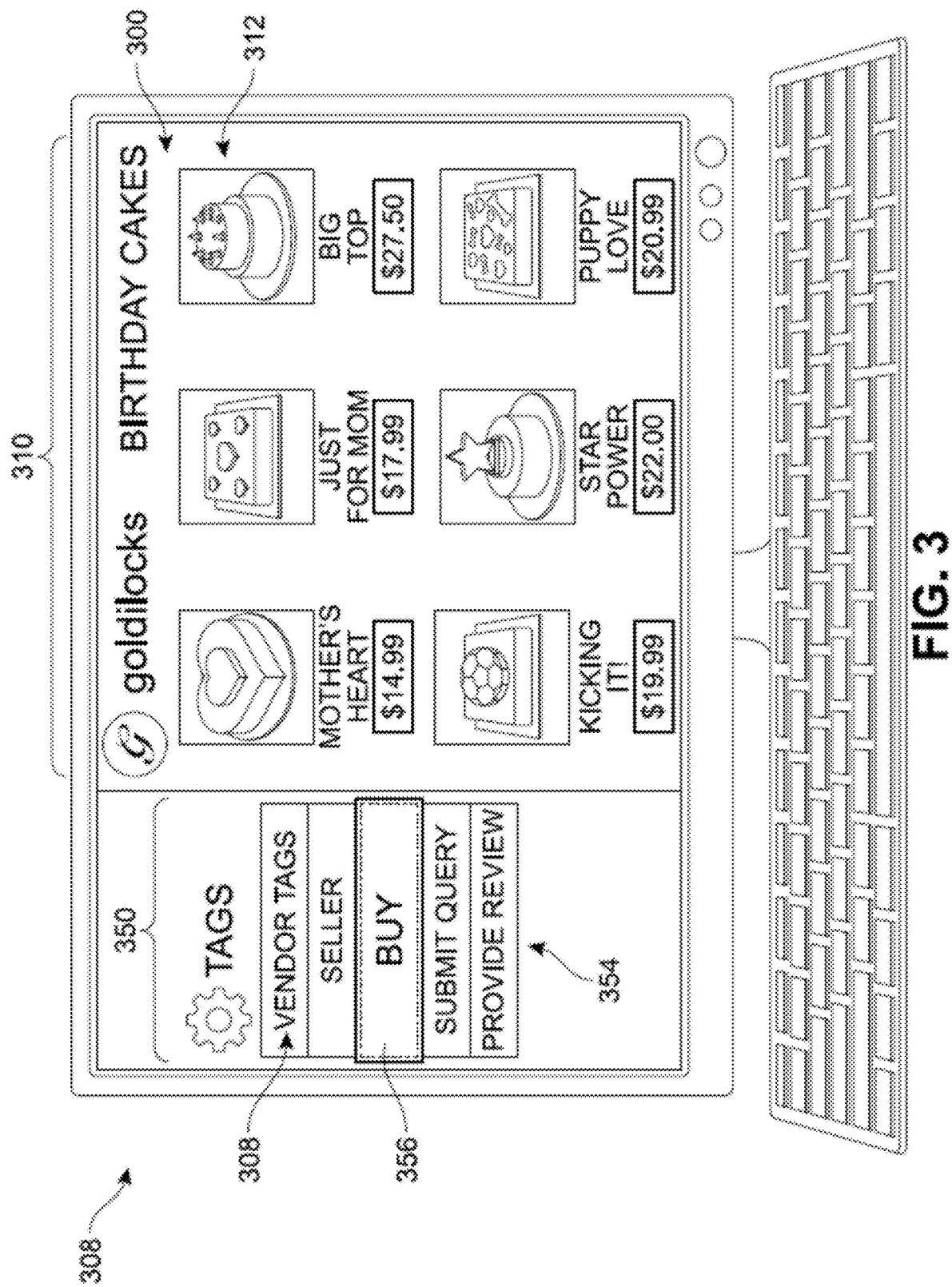
FIG. 3 is a display diagram illustrating an implementation of a user interface for an application configured to provide annotative tools for electronic content items.

For purpose of clarity for the reader, FIGS. 3-11 present some examples of user interfaces by which augmented electronic content sharing may occur. Referring first to FIG. 3, an implementation of a display 300 for a computing device 308 is illustrated. In different implementations, the display 300 may present various icons, interfaces, graphics, applications, or other device status information. As an example, the display 300 includes a representation of user access of a file associated with a first application. For purposes of simplicity, the first application in FIG. 3 is an image processing and presentation program that includes a viewing interface 310 configured to facilitate the user's access to various documents or files via the application. Here the viewing interface 310 presents a first content item 312 for the user to view or modify.

Once a user accesses an electronic content item, they may be able to access options or tools that can be used in association with the content item or application. As shown in FIG. 3, the first content item 312 is being presented in conjunction with a first annotation interface ("first interface") 350 of an annotation management system, identified in this case by a header "TAGS". In some implementations, the first interface 350 can be separate from, or positioned or located adjacent or proximate to the viewing interface 310 of the first application, or may extend outward from the viewing interface 310. In another implementation, the first interface 350 can be disposed within a region of the viewing interface 310, and/or can be offered as a feature of the first application itself. The first interface 350 can be configured to display or present various options by which a user may select or customize a tag and/or associate the selected tag with the content item. These options can be presented independently through a tagging software application, or can be offered as a part of the features of the first application itself. For example, a user may choose to print, save, share, close, etc. the currently accessed item, as well as modify or associate one or more of the tags to the item through a single application.

In some implementations, the first interface 350 can include navigational tools or headings to assist a user in their efforts to navigate the available annotations. In FIG. 3, a main header 352 ("Vendor Tags") is displayed, indicating that the user is currently viewing the tags classified or commonly used by customers interested primarily in transactional type services. In other words, the tag listing may be modified or requested to display those tags that are frequently used by those who are involved in business exchanges, merchant tasks, and other product related interactions. In other implementations, the tags may be sorted or filtered by other means, or a user may customize the listing of tags that are shown. In this case, a plurality of annotation options 354 are shown, in which a first option 356 ("BUY") is selected. This tag, when selected, can be associated with the electronic content currently displayed shown in the viewing interface 310. In this example, the content being illustrated is a menu or catalog of cakes, including depictions of each cake, its title, and its price.

As noted previously, in some implementations, the annotation management system can be configured to identify one or more characters or symbols in a particular electronic content item as corresponding to a desired tag. In this specific example, when the user selects or activates the "BUY" tag, the system can be configured to detect all instances of a "$" (dollar sign) with a number, and at each of these instances, pair or add executable instructions to the instance. In other implementations, a user can select (e.g., with a mouse click, mouse highlight, or other interaction event) each instance where the executable annotation is desired and manually link or pair the tag with the instance. Once one or more tags are added or inserted into an electronic content, the sharing or other transference of the content to another location can automatically trigger the execution of the task, as reflected in FIGS. 4 and 5.

Figure 4:
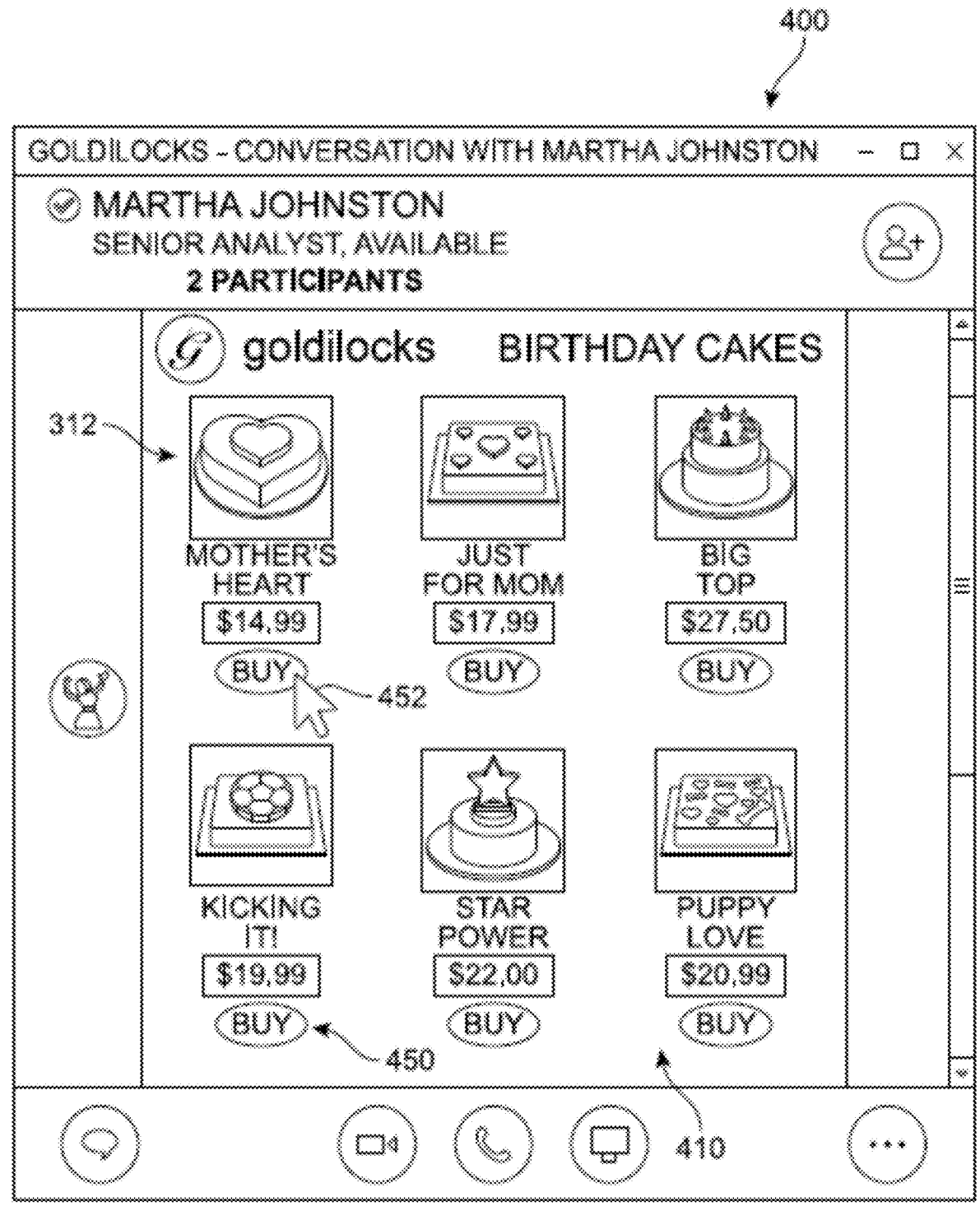
FIG. 4 is a display diagram illustrating an implementation of a user interface for a communications application conveying an augmented electronic content item to a recipient.
Figure 5:
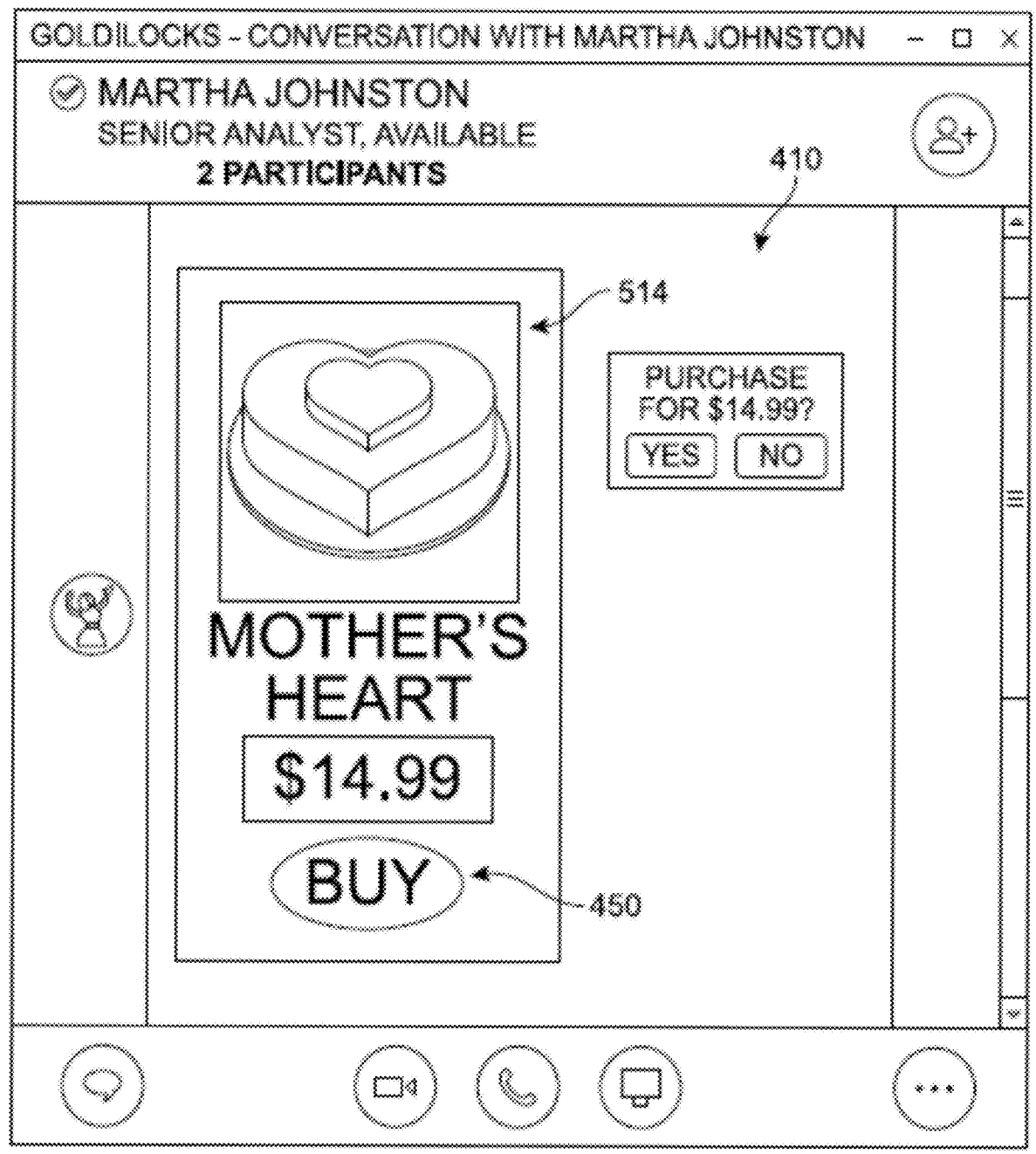
FIG. 5 is a display diagram illustrating an implementation of a user interface for a communications application presenting a response to an interaction event by the recipient.

In FIG. 4, the first content item 312 has been communicated, transmitted, shared, or sent from the sender to a second user (recipient) via an instant messaging application. In different implementations, the augmented electronic content item as presented to the recipient can offer a 'call to action' button or an actionable option that, if selected, can route the recipient to a pre-defined destination, receive, store, and/or share information resulting from the selection of the actionable option, and/or guide the recipient through a process, as designated by the sender. As the first content item 312 is rendered and displayed for the recipient (here, Martha Johnston) in a messaging interface 410, it can be seen that in addition to original content layer of the electronic content item itself, a second, contextual content layer is also manifested. The contextual content layer refers to any content that has been added in response to execution of instructions associated with the selected tag. In this case, the contextual content layer is presented to the recipient in the form of a plurality of native controls or actionable options ("BUY") 450 that are displayed adjacent to each product. In some implementations, each button when selected can be configured to perform an action or initiate a process. Thus, in some implementations, the 'task' to be performed by the insertion of the annotation by the sender includes rendering of a new (contextual) layer of content along with the original electronic content.

In some implementations, the receiver client device interprets the annotated electronic content and the rendering occurs within the messaging application main window or is displayed by a separate application (e.g., a web browser invoked with a URL or a map application invoked with an address). In one implementation, the contextual layer can be displayed in various modes, such as overlay (floating above the electronic content), replace (floating above particular portions of the electronic content, thereby "hiding" the content), side panel (present in a side panel adjacent to the electronic content, possibly in the form of a small preview that can be interacted with), and margin (present in a margin area of the electronic content, possibly in the form of a very limited preview).

Figure 6:
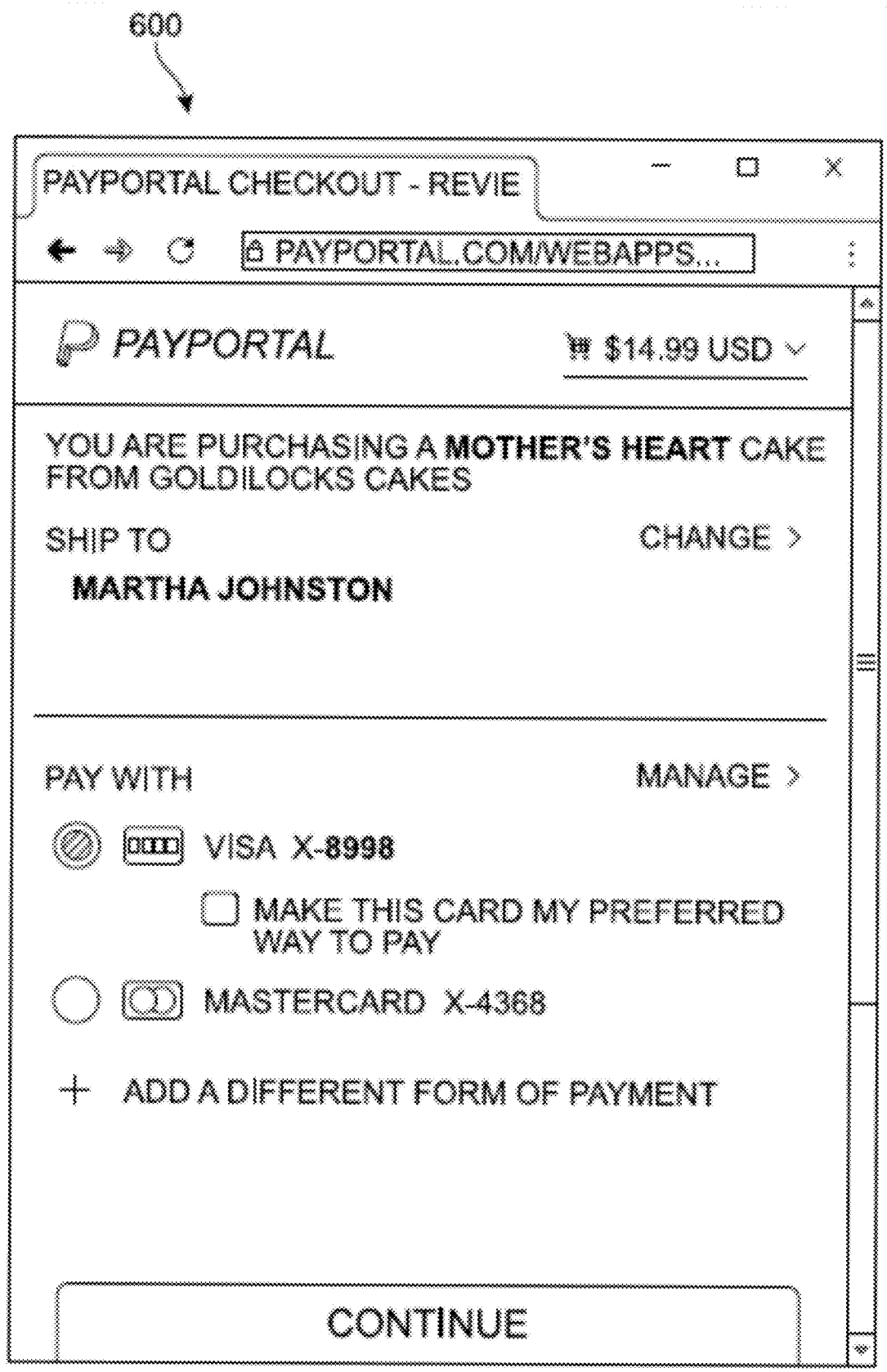
FIG. 6 is a display diagram illustrating an implementation of a user interface for payment processing application.

If a recipient clicks or otherwise selects one of the actionable options 450, as represented by a mouse cursor 452 in FIG. 4, a new process can be initiated in conjunction with the instant messaging application. For example, referring to FIG. 5, a new visual (second content item 514) may be displayed in the messaging interface 410, providing the recipient with an opportunity to proceed/confirm with the transaction selected in FIG. 4. Additional actions may occur as the recipient continues to provide inputs to the system. In FIG. 6, in response to a confirmation by the recipient of this purchase, a webpage 600 has opened on the same computing device for processing of the recipient's payment. Thus, it can be seen that in some implementations, the system can be configured to initiate or perform processes that involve multiple steps and/or applications, receive and process inputs from a variety of sources, and/or integrate information occurring at different points in time to provide a seamless user experience.

Figure 7:
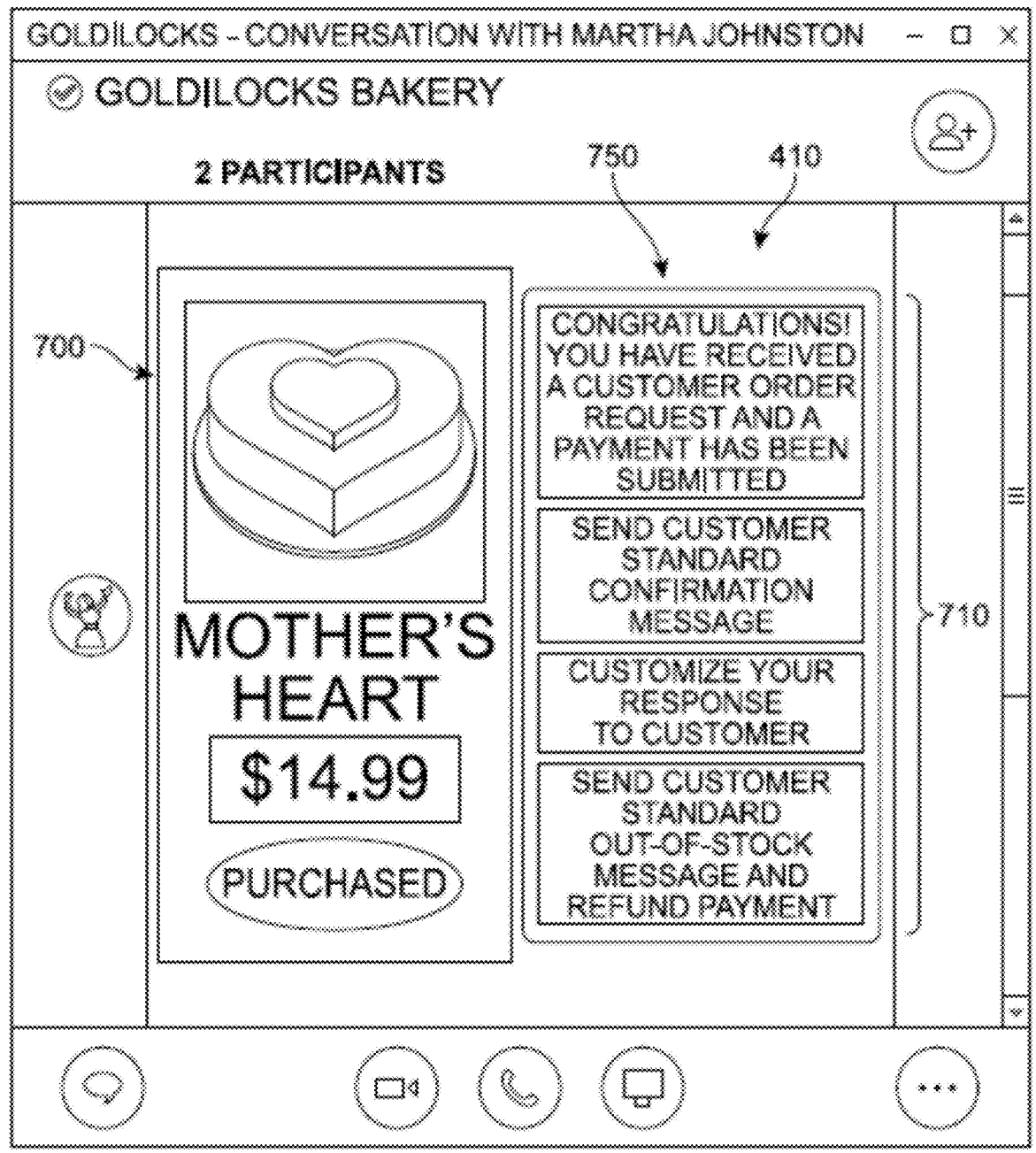
FIG. 7 is a display diagram illustrating an implementation of the instant messaging application presenting an automatic notification informing the sender that a purchase has occurred and/or provide details about the transaction.

As the recipient interacts with the contextual content layer and engages in any subsequent steps, in different implementations, the system can be optionally configured to update or notify the sender of the progress or status of the transaction. For example, in some implementations, as depicted in FIG. 7, the instant messaging application can present an automatic notification 700 informing the sender that a purchase has occurred and/or provide details about the transaction. In some implementations, the sender may also be automatically presented with one or more suggested responses or options. In this example, a second interface 750 is shown within the messaging interface 410 that offers a plurality of options 710 for responding to the notification 700. In other implementations, the second interface 750 may be independent to the messaging interface 410, or no additional options may be offered to the sender.

Figure 8A:
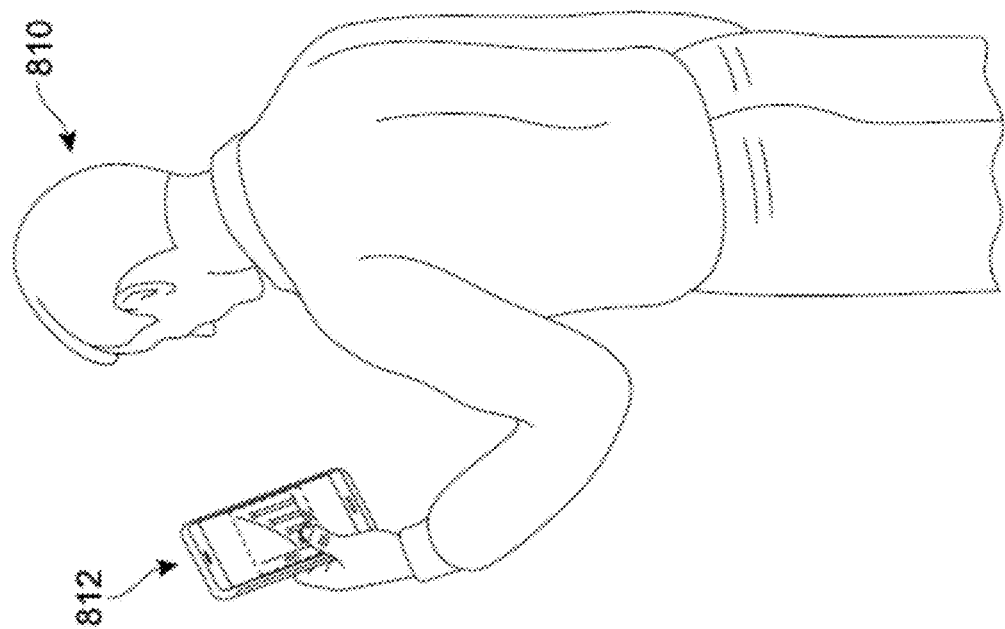
FIGS. 8A-8F are a sequence of illustrations depicting an implementation of an image sharing interface and an example of an execution of instructions tagged with the image as it is shared.
Figure 8A:
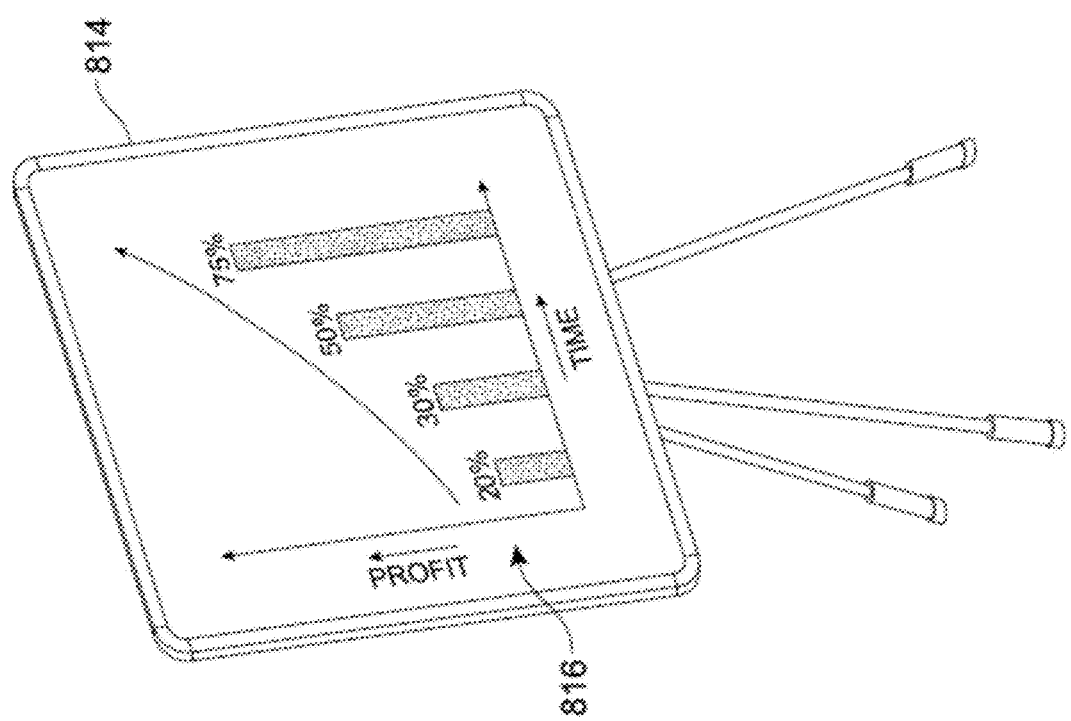
Figure 8B:
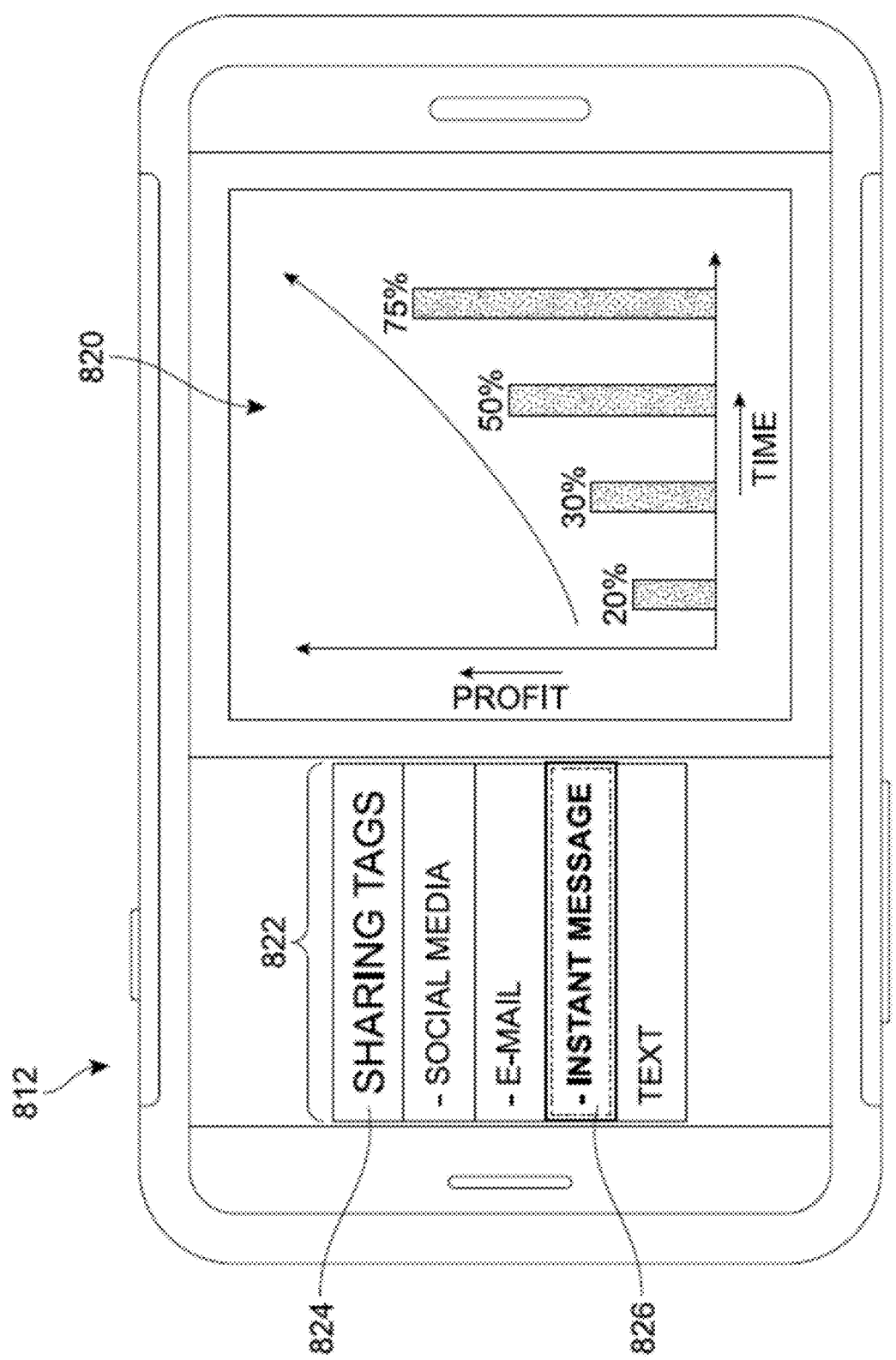
Figure 8C:
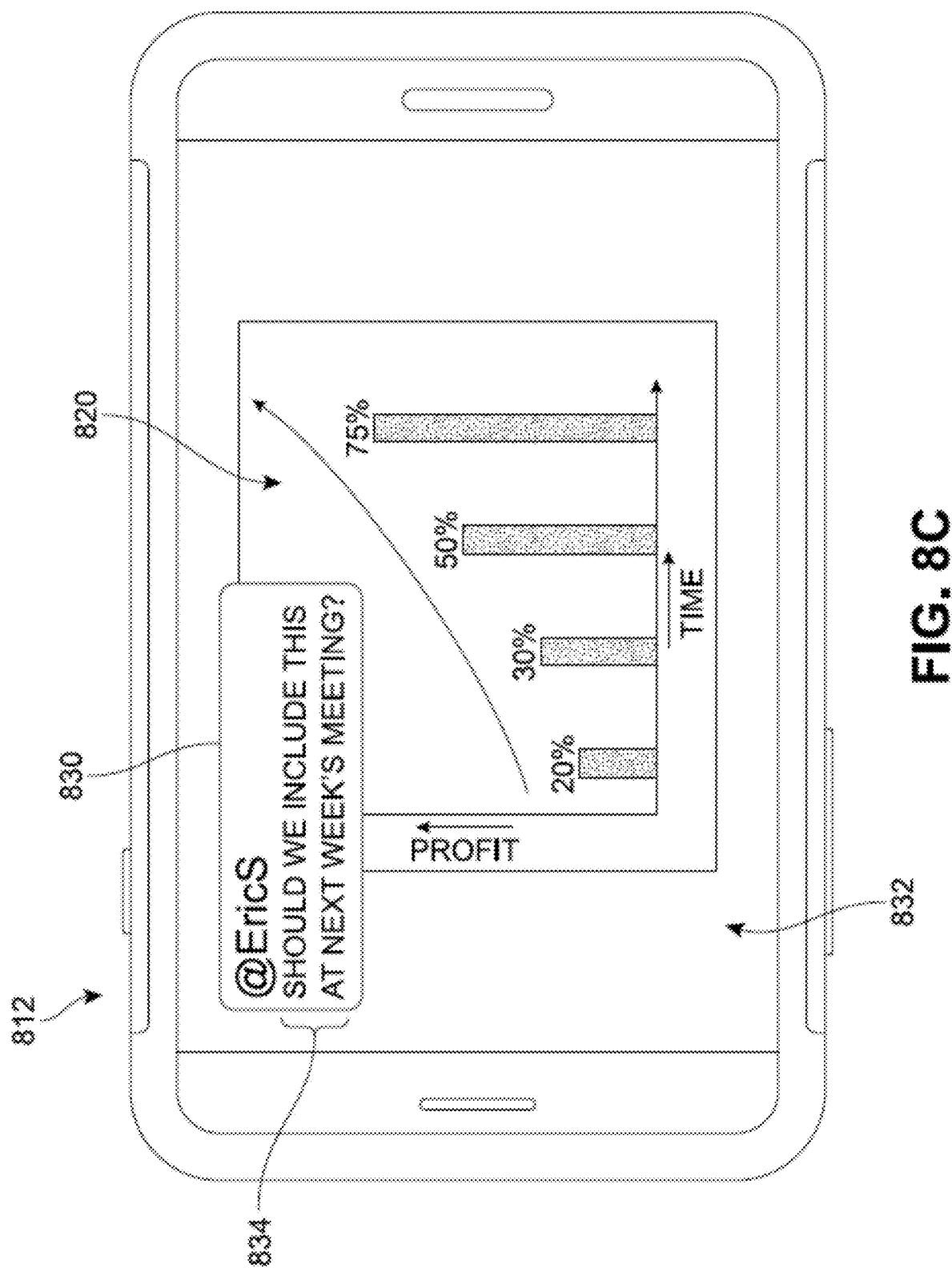

As noted earlier, in different implementations, the executable annotations can be configured to initiate a wide range of tasks. Another example is presented with reference to FIGS. 8A-8F. In FIG. 8A, a first user 810 is shown capturing a photo on a mobile device 812 of a whiteboard 814 that includes a graph 816. In FIG. 8B, the captured image (third content item 820) is viewed on the mobile device 812 and, alongside it, a second annotation interface ("second interface") 822. In contrast to the first interface 350 of FIG. 3, the tags offered in the second interface 822 are categorized under a "Sharing Tags" header 824, and are directed to tasks that enable sharing of the electronic content item. Having chosen an "instant message" option 826 in FIG. 8B, the sender can be prompted to add details to shape the execution of the selected task. In FIG. 8C, the sender has inserted a tag 830 with a message 834 ("@EricS Should we include this at next week's meeting?"), thereby creating an augmented content item 832. In some implementations, the system can be configured, based at least on the data inputted into tag 830, to initiate a specific set of actions, as will be discussed below with reference to FIG. 8F.

Figure 8D:
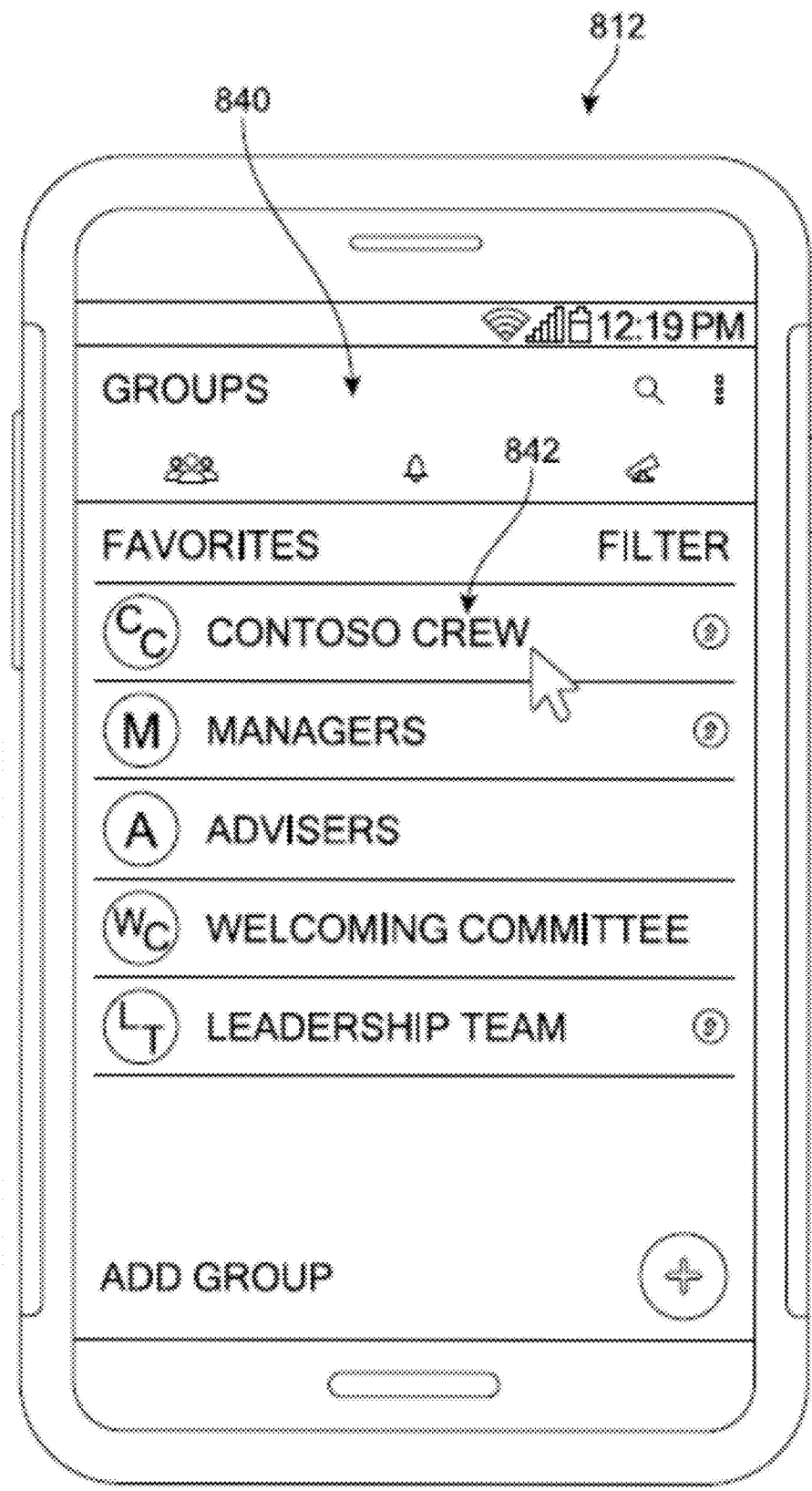
Figure 8E:
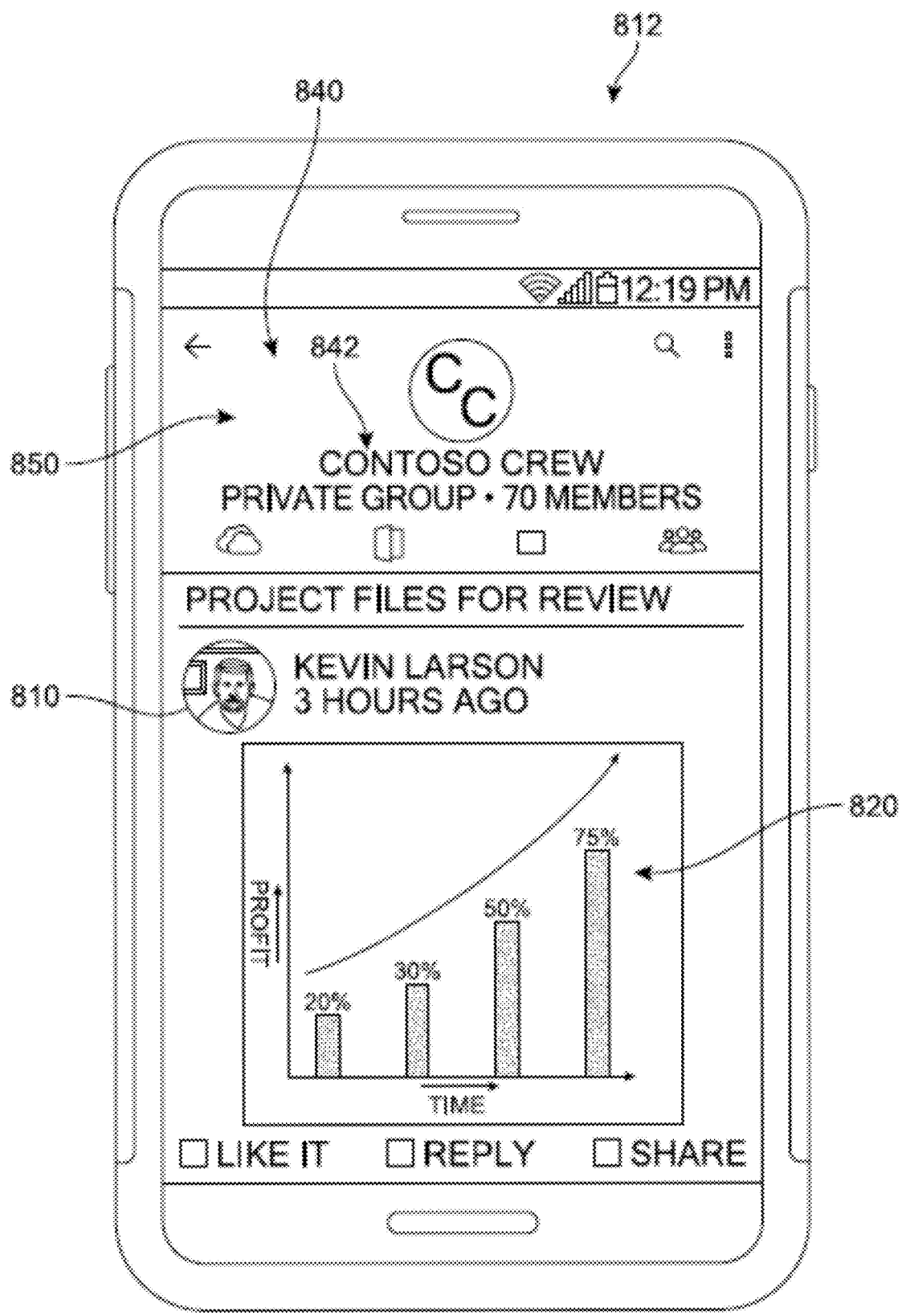
Figure 8F:
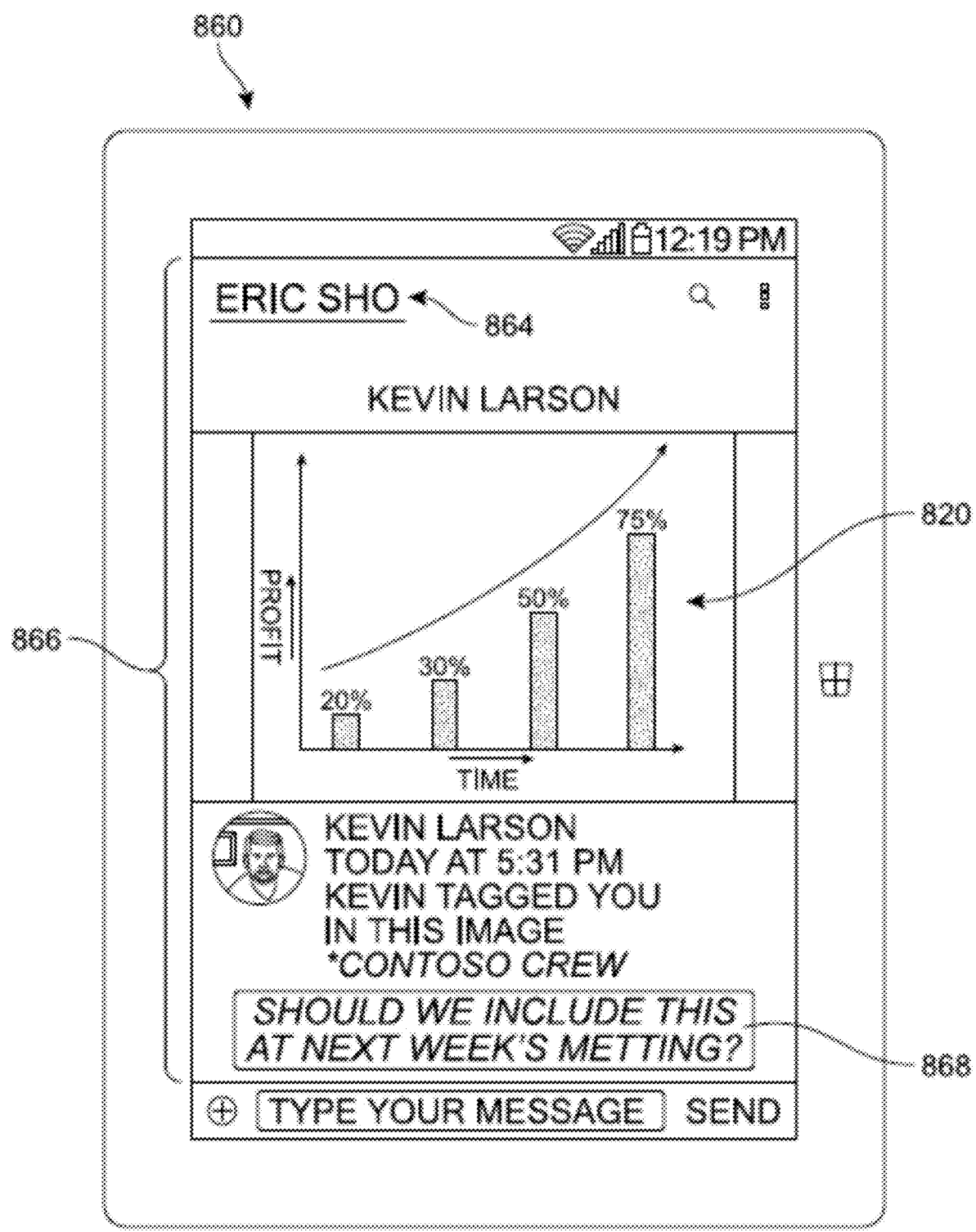

In FIG. 8D, the first user opens a social media application 840 and identifies a recipient ("Contoso Crew") 842 for the third content item, which in this case corresponds to a larger user group that can include multiple members. In FIG. 8E, it can be seen that the posting of the third content item 820 has been successfully added to a recipient group page 850. Furthermore, the tag 830 of FIG. 8C is not visible, nor are any indications that the content was augmented revealed to the group. In other words, in some implementations, the system can be configured to remove some or all traces of the tag 830 when it is shared. In addition, upon sharing of the third content item 820 with the recipient 842, the system can interpret the tag content and execute the associated task. In this case, as shown in FIG. 8F, the third content item 820 is automatically brought to the attention of an individual user account 862 associated with the "EricS" username via a separate instant message on a second mobile device 860. Thus, while the third content item 820 was shared on the recipient group page 850 a result of manual actions by the sender, the subsequent (or substantially simultaneous) presentation of the image on Eric Sho's channel 866 as well as any optional message content 868 occurred automatically as a result of the execution of instructions conveyed by the tag. Thus, in some implementations, a sender can designate or identify one or more individuals that should be particularly 'called out' or notified regarding the shared content item (as well as a specific message content) via the tag, and the system can 'translate' the tag and automatically convey the message to the designated person(s) with the message.

Figure 9:
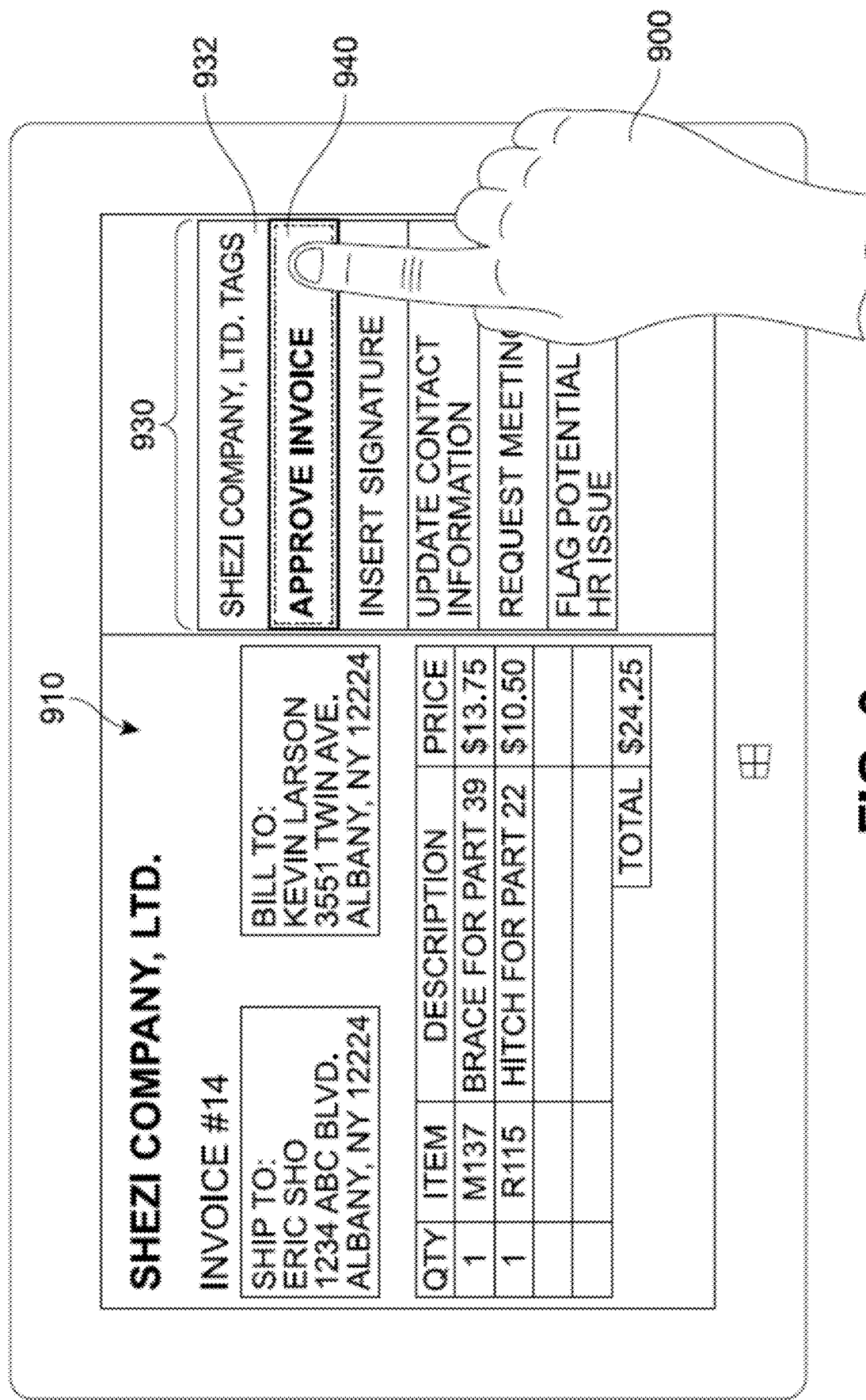
FIG. 9 is a display diagram illustrating an implementation of a user interface for an application configured to provide annotative tools for electronic content items.
Figure 10:
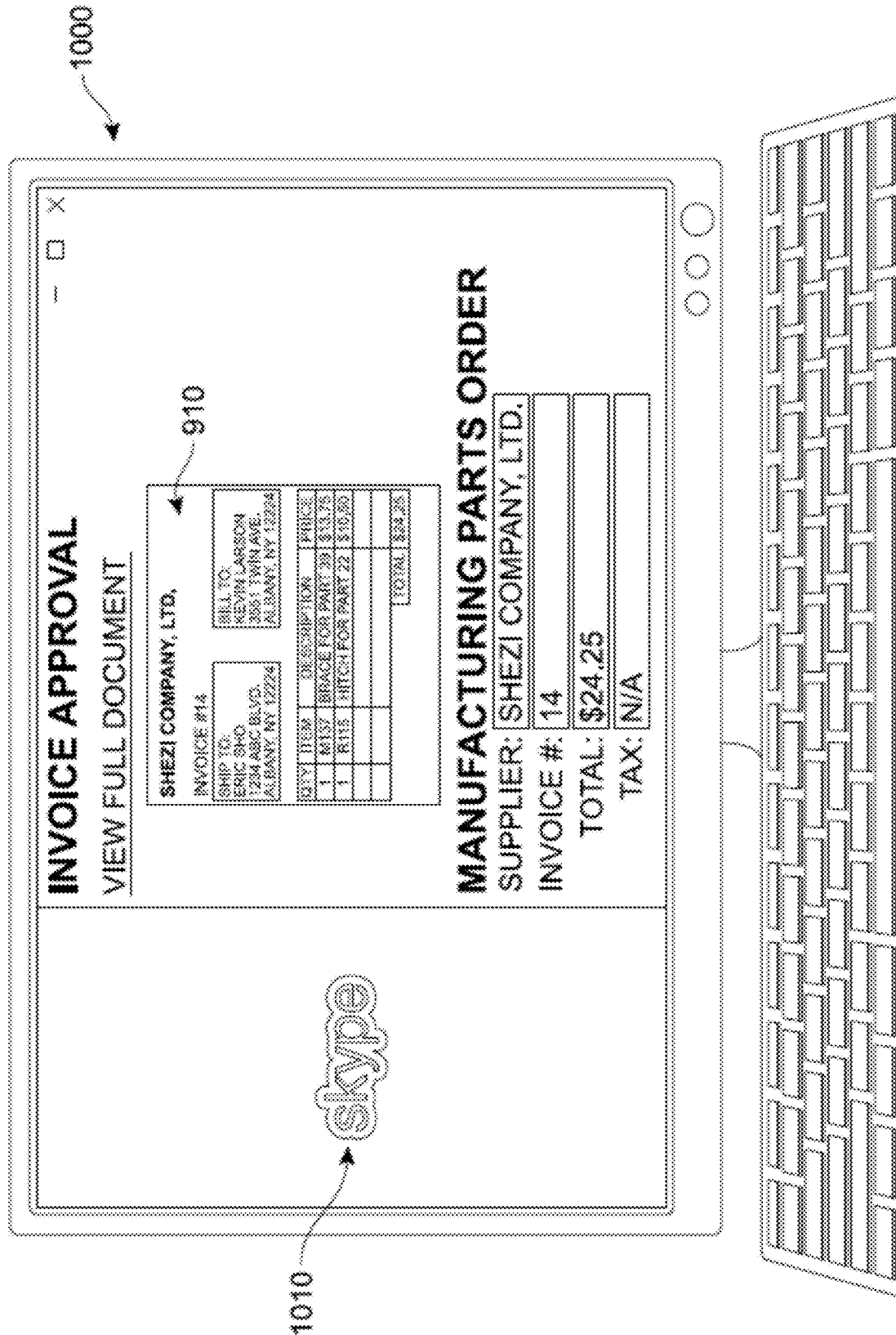
FIG. 10 is a display diagram illustrating an implementation of a user interface following execution of instructions conveyed via the augmented electronic content item of FIG. 9.
Figure 11:
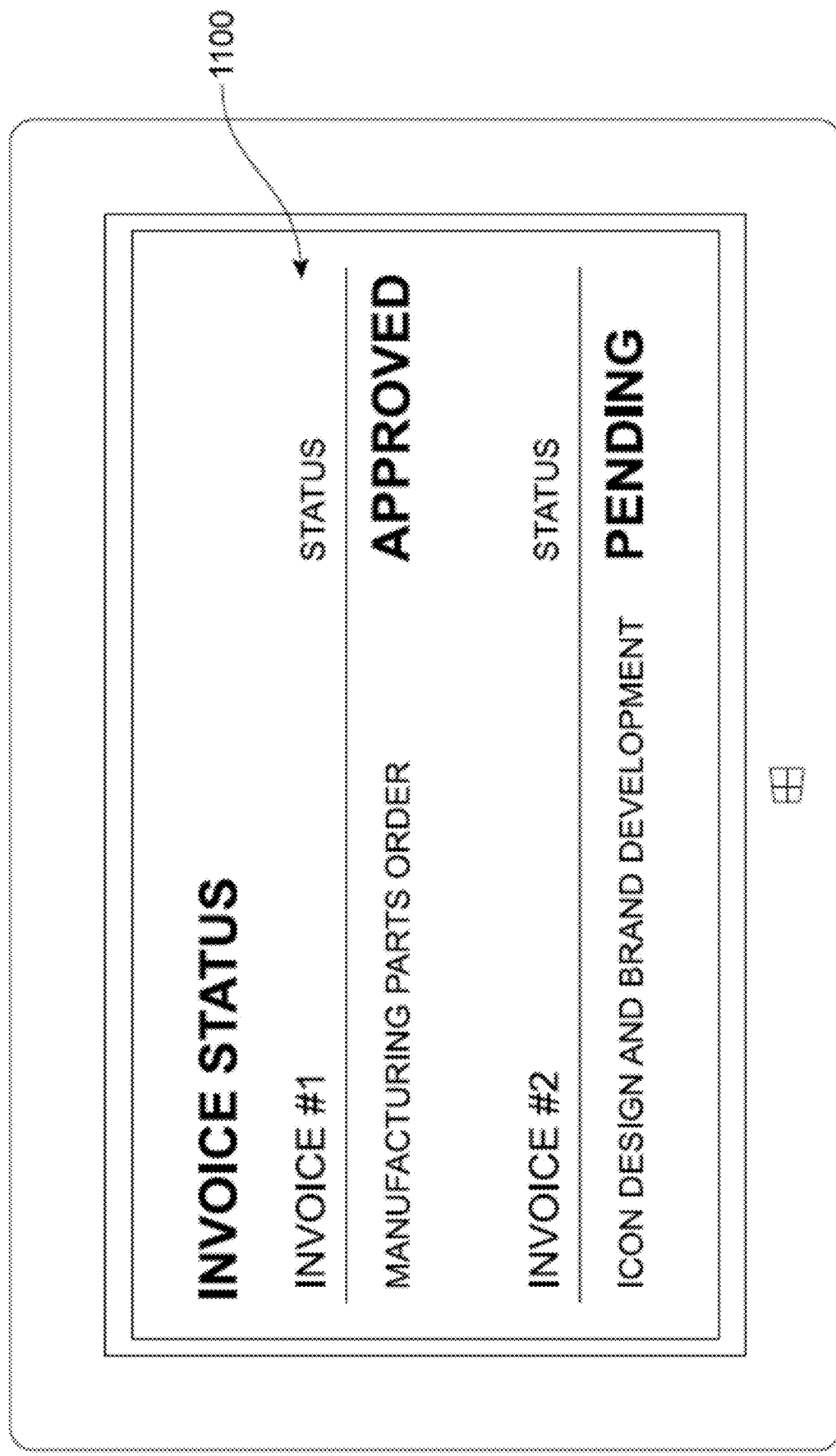
FIG. 11 is a display diagram illustrating an implementation of a user interface for an application configured to receive status information related to the electronic content item of FIG. 9.

For purposes of clarity, an additional example of the disclosed system is presented now with reference to FIGS. 9-11. In FIG. 9, a sender (represented by a hand) 900 views a document (fourth content item 910). In this case, the document is an invoice for services. The sender 900 would like to receive her manager's approval for the invoice. In different implementations, the system can include provisions for providing organizations or other users with the ability to custom create or designate tags for day-to-day use. In this example, the sender 900 accesses a third annotation interface ("third interface") 930, which includes a header "Shezi Company, Ltd. Tags" 932. The header 932 identifies the listed options as being specifically offered for the company's use, and/or were created by members of the company in anticipation of the request for tasks commonly requested by employees. In FIG. 9, the sender 900 selects an "Approve Invoice" option 940, which triggers an automatic association of a pre-defined tag with the fourth content item 910. When the fourth content item 910 is shared with another user, the tag can be activated and its corresponding instructions executed. In some implementations, as shown in FIG. 10, the presentation of the fourth content item 910 can occur within a particular user interface (here for a messaging application 1010) or display context rendered by receiver's computing device 1000 as a result of executing the tag associated with the fourth content item 910. In other words, although the tag itself is not shared, the content of the tag serves to directly transform or reshape the receiver's user experience of the document. Rather than simply present the document, for example, as an attachment, the application can present the content directly in the context deemed to be best suited to achieve the sender's goals. In some other implementations, the message to the recipient can include a portal or link to an Invoice Approval system. When the recipient accesses the link, the document displayed in a way that immediately and clearly indicates the type of response desired by the sender, and provides a simple and efficient means of submitting the response.

In some implementations, the recipient's selected response can be conveyed back to the sender in the same communication format used by the sender to share the electronic content. In other implementations, the sender can request notification of a response via designation of some other communication mechanism. In some implementations, the executable annotation can be configured with instructions that when executed automatically update a record or database, or incorporate the information from the response into another application. In FIG. 11, it can be seen that an Invoice Status database 1100 has been automatically updated following submission of the response by the recipient.

Figure 12:
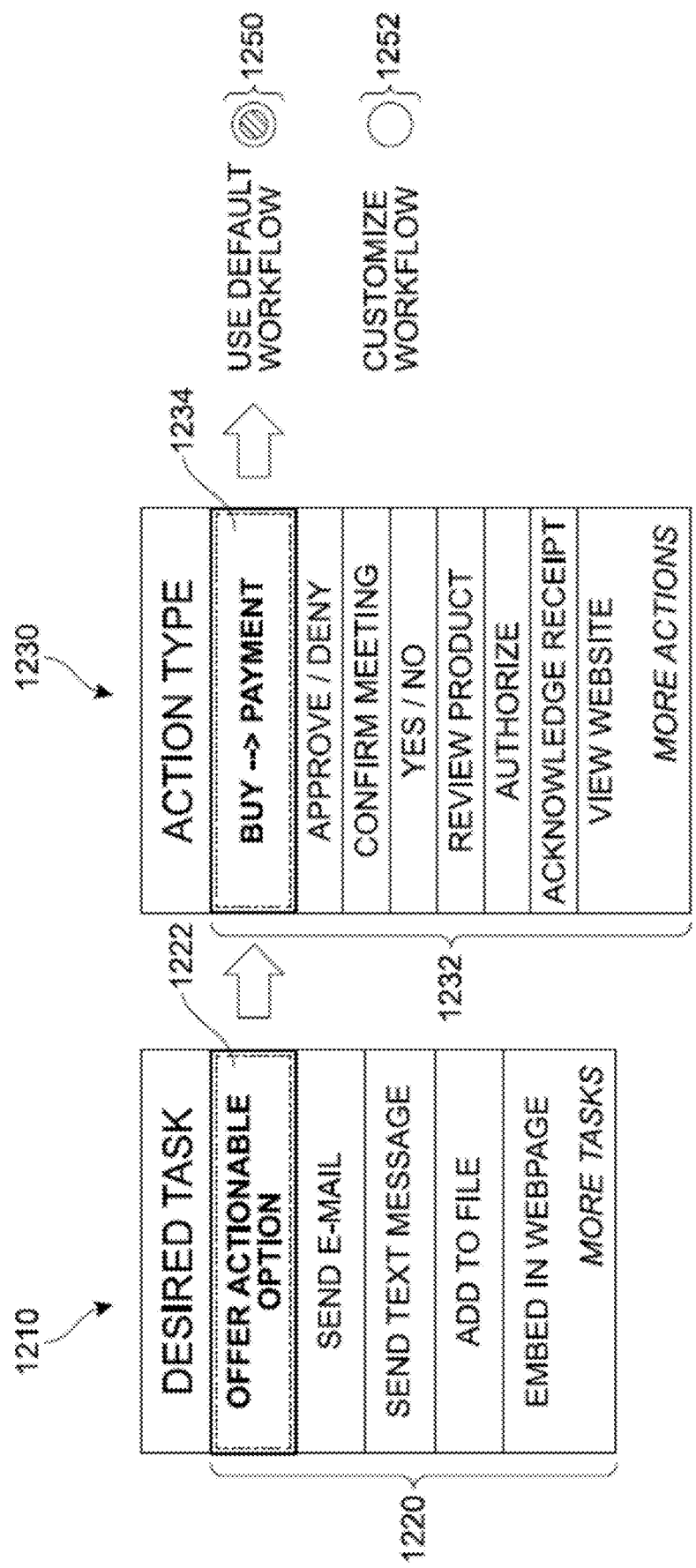
FIG. 12 is a process diagram of an implementation for user customization of annotative tools.

As noted earlier, in some implementations, the system may include provisions for enhancing the specificity by which users can select or assign particular annotation-task pairs to electronic content items. In some implementations, users can directly assign a classification, label, or category to one or more desired tasks, and/or designate the type of annotative tools that should be offered or made available. As one example, FIG. 12 presents a first customization menu 1210, in which a plurality of possible tasks 1220 is shown. It should be understood that the specific tasks and actions depicted in FIG. 12 are for shown purposes of simplicity only, and a wide range of other possible selections (including tasks that are specifically described via manual user input, such as a series of building blocks or a custom designed path identifying a particular process that is desired to be triggered).

In FIG. 12, the tasks 1220 include a first task 1222 ("Offer Actionable Options") that has been selected by a user, indicating a goal of augmenting the electronic content item, such that when the item is presented to a receiver the presentation will also include a mechanism for responding efficiently, in a manner that bypasses many cumbersome user intensive manual steps that would otherwise be needed to perform the task. For example, this can be conveyed by selectable button(s) or option(s) that when selected by the recipient will perform some specified action. In response, in some implementations, the system can present a second customization menu 1230, where the task type chosen in the previous step has resulted in a plurality of actions 1232 being shown that can be linked to the selectable button, and which will be displayed to the recipient. In this example, the user has selected a first action 1234 ("BUY→PAYMENT") indicating that activation of the option by a recipient should trigger a payment process associated with all or a designated portion of the electronic content item. In some implementations, the user may wish to make use of the payment process workflow already offered by the system (see first option 1250). However, in other implementations, a user can access another interface that will provide the user with the opportunity to manually identify and designate the process that should occur in order to elicit the payment from the recipient (see second option 1252).

In different implementations, the system can offer many types of annotative task-action pairings. Some examples are also shown in FIG. 12, including "Send E-mail" and "Send text message", the selections of which can indicate that the electronic content item is being annotated with a desire of having the system convey the electronic content item to a specific recipient via one or more communication channels. Similarly, "Add to file" can indicate a desire to insert or add the electronic content item to an existing or new file located at a specific location or path. An "Embed in webpage" selection can indicate that the electronic content item should be inserted or added to a specific webpage, such as a social media page or blog. Many other tasks are possible, including but not limited to those providing features described earlier with respect to FIGS. 1-11.

In addition, in one embodiment, the manner in which the augmented content is displayed can be configurable from a fixed set of options. Options include, for example, simple formatting, display mode, and automatic layer launch. Simple formatting includes, for example, text style options (e.g., font, color, highlighting, italics, boldface, underlining, and outlining) and indicators (e.g., mini-icons or chiclets) that would be shown to the receiver in conjunction with the particular electronic content item being shared.

Figure 13:
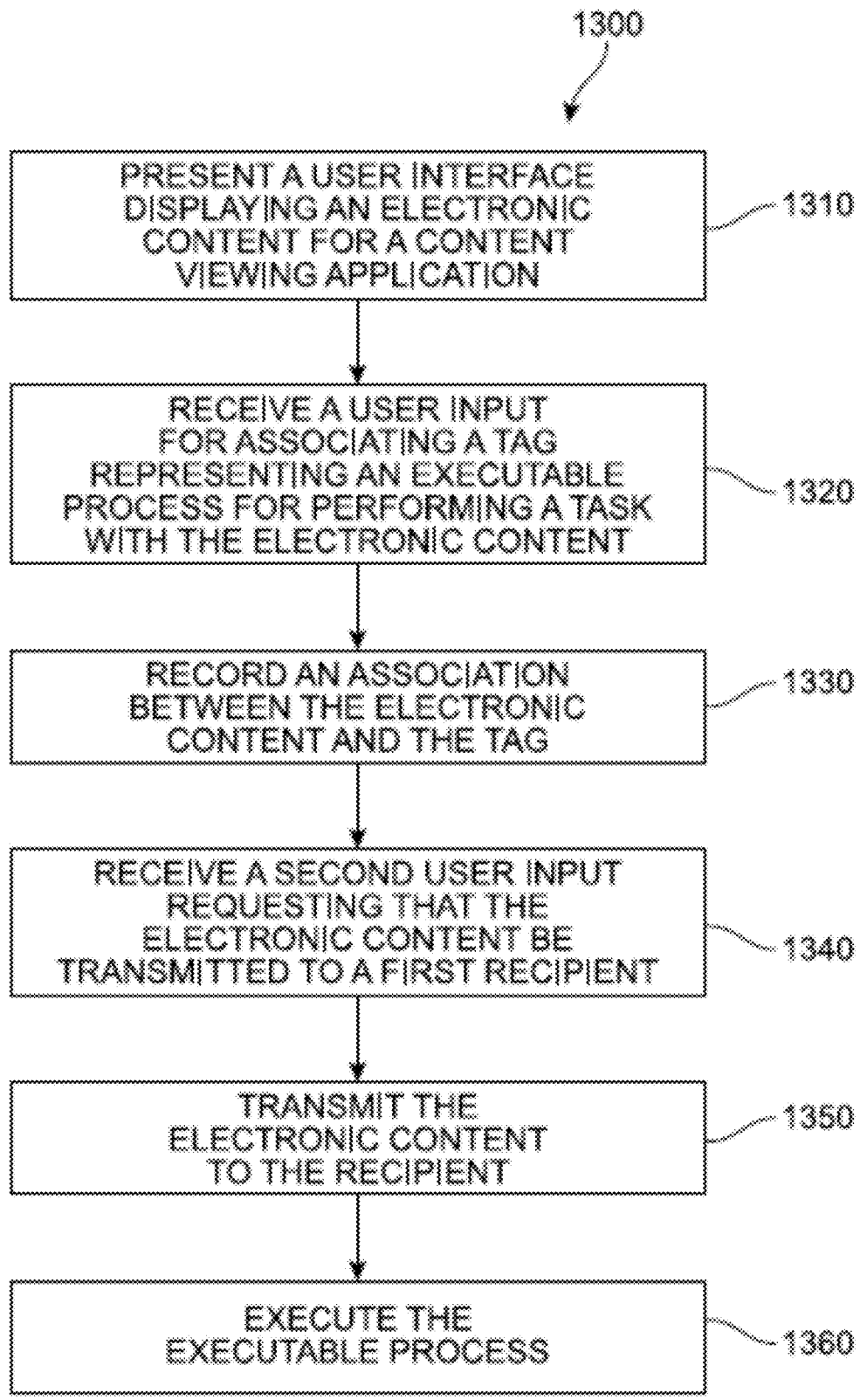
FIG. 13 is a flow diagram illustrating an implementation of a process for sharing and managing annotated electronic content.

FIG. 13 is a flow chart illustrating an implementation of a method 1300 of annotating an electronic content item and initiating a task associated with the annotation. A first step 1310 of the method 1300 includes presenting, on a first client device, a first user interface for a first content viewing application, the first user interface displaying a first electronic content. A second step 1320 includes receiving, from a first user, a first user input for associating a first tag with the first electronic content. The first tag represents a first executable process for performing a first task. In a third step 1330, the method includes recording, in response to receiving the first user input, an association between the first electronic content and the first tag, and a fourth step 1340 includes receiving, from the first user, a second user input requesting that the first electronic content be transmitted to a first recipient. A fifth step 1350 includes transmitting, in response to receiving the second user input, the first electronic content to the first recipient, and a sixth step 1360 involves executing, in response to transmitting the first electronic content, the first executable process.

In other implementations, the method may include additional steps or aspects. In some implementations, the method may also include presenting, on the first client device, an annotation menu offering a plurality of selectable tags that includes the first tag. In some cases, each tag of the plurality of tags represents a different type of executable process that may be associated with electronic content, and the first user input results from a selection of the first tag from the annotation menu. In another implementation, the method also includes presenting to the first recipient, during execution of the first executable process, a first selectable option for initiating a performance of an action in conjunction with the first electronic content. In some implementations, the action includes providing, to the second user, a payment information interface for receiving payment method details, while in other implementations, the action includes modifying a record associated with the first electronic content.

As another example, the method may include automatically generating, during execution of the first executable process, a first message to a second recipient, wherein the first message includes a copy of the first electronic content. In some cases, transmission to the first recipient occurs via a first telecommunications service and transmission to the second recipient is occurs via a second telecommunications service that differs from the first telecommunications service. As a further example, the method can include receiving, from the first user, a third user input requesting that a second tag be associated with the first electronic content item, the second tag representing a second executable process for performing a second task, as well as recording, in response to receiving the third user input, an association between the first electronic content and the second tag. In addition, the method can include executing, in response to transmitting the first electronic content, the second executable process, and automatically generating, in response to executing the second executable process, a second message to a third recipient, the third recipient being a member of the first recipient.

In addition, the method can include receiving, from the second user, a third user input selecting the first selectable option, thereby triggering performance of the action, and then presenting, in response to receiving the third user input, a second selectable option to the first user for accessing details associated with the performance of the action. In one implementation, the method also includes automatically generating a message to the first user indicating that the action occurred. In some implementations, the first user input includes at least a first content element configured to trigger generation of a tag, and the may method further include ascertaining the first user input includes the first content element, and then determining, in response to ascertaining the first user input includes the first content element, that the first user input corresponds to a request to generate a tag for association with the first electronic content. In another example, the method may involve receiving, from a second user, a third user input designating which selectable tags are to be offered in the annotation menu. In some cases, a virtual label may be incorporated or added to the electronic content that is only visible to the first user. In another example, a user may provide an input specifically designating a pairing between a tag type, a task, and/or an action.

The use of the disclosed systems and methods can enable users to share electronic content in a manner that is better aligned with their intentions for that item. In addition, organizations can define their preferred tags that senders can use as well as define the behavior of the listed tags, and how each tag will be manifested at the receivers end. Furthermore the behavior can be defined to manifest in a way that makes effective use of the native capabilities at the receiver's end. In different implementations, this system can be configured to interpret various augmentation layers and can be capable of retaining, executing, and rendering them on an endpoint at the receivers end. If a receiver interacts with the contextual layer presented in such a way that triggers a corresponding process, a service that aggregates these actions, and triggers follow up workflows based on these interactions can be initiated.

For the sake of simplicity of description, details are not provided herein for performing various steps. Implementations of the present disclosure can make use of any of the features, systems, components, devices, and methods described in U.S. Pat. No. 7,243,301 to Bargeron et al., issued Jul. 10, 2007 and entitled "Common Annotation Framework," the disclosure of which is herein incorporated by reference in its entirety.

The detailed examples of systems, devices, and techniques described in connection with FIGS. 1-13 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-13 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 14:
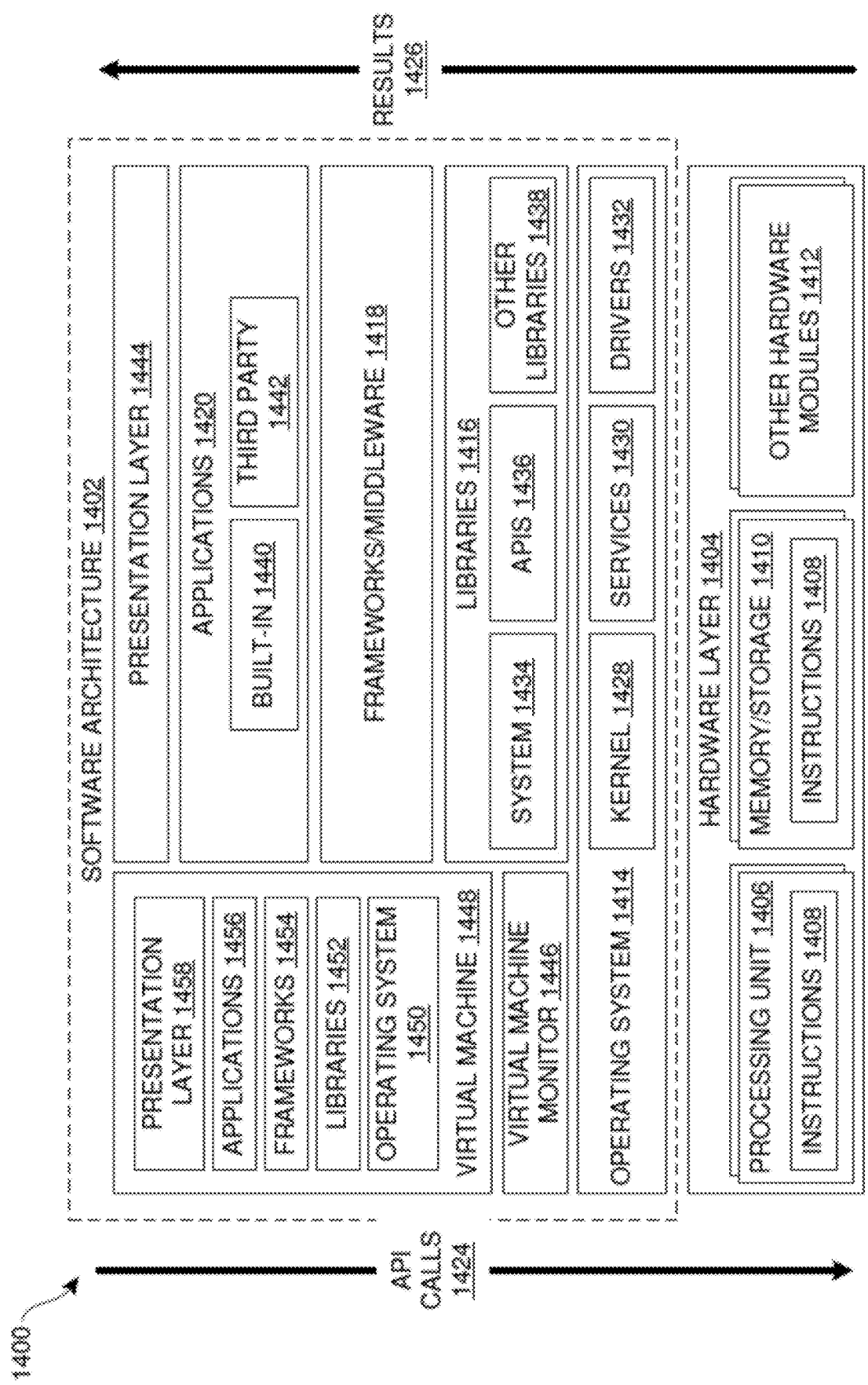
FIG. 14 is a block diagram of an example computing device, which may be used to provide implementations of the mechanisms described herein.

FIG. 14 is a block diagram 1400 illustrating an example software architecture 1402, various portions of which may be used in conjunction with various hardware architectures herein described, which may implement any of the above-described features. FIG. 14 is a non-limiting example of a software architecture and it will be appreciated that many other architectures may be implemented to facilitate the functionality described herein. The software architecture 1402 may execute on hardware such as a device 150 of FIG. 1A that includes, among other things, document storage 1070, processors, memory, and input/output (I/O) components. A representative hardware layer 1404 is illustrated and can represent, for example, the device 150 of FIG. 1. The representative hardware layer 1404 includes a processing unit 1406 and associated executable instructions 1408. The executable instructions 1408 represent executable instructions of the software architecture 1402, including implementation of the methods, modules and so forth described herein. The hardware layer 1404 also includes a memory/storage 1410, which also includes the executable instructions 1408 and accompanying data. The hardware layer 1404 may also include other hardware modules 1412. Instructions 1408 held by processing unit 1408 may be portions of instructions 1408 held by the memory/storage 1410.

The example software architecture 1402 may be conceptualized as layers, each providing various functionality. For example, the software architecture 1402 may include layers and components such as an operating system (OS) 1414, libraries 1416, frameworks 1418, applications 1420, and a presentation layer 1444. Operationally, the applications 1420 and/or other components within the layers may invoke API calls 1424 to other layers and receive corresponding results 1426. The layers illustrated are representative in nature and other software architectures may include additional or different layers. For example, some mobile or special purpose operating systems may not provide the frameworks/middleware 1418.

The OS 1414 may manage hardware resources and provide common services. The OS 1414 may include, for example, a kernel 1428, services 1430, and drivers 1432. The kernel 1428 may act as an abstraction layer between the hardware layer 1404 and other software layers. For example, the kernel 1428 may be responsible for memory management, processor management (for example, scheduling), component management, networking, security settings, and so on. The services 1430 may provide other common services for the other software layers. The drivers 1432 may be responsible for controlling or interfacing with the underlying hardware layer 1404. For instance, the drivers 1432 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1416 may provide a common infrastructure that may be used by the applications 1420 and/or other components and/or layers. The libraries 1416 typically provide functionality for use by other software modules to perform tasks, rather than rather than interacting directly with the OS 1414. The libraries 1416 may include system libraries 1434 (for example, C standard library) that may provide functions such as memory allocation, string manipulation, file operations. In addition, the libraries 1416 may include API libraries 1436 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1416 may also include a wide variety of other libraries 1438 to provide many functions for applications 1420 and other software modules.

The frameworks 1418 (also sometimes referred to as middleware) provide a higher-level common infrastructure that may be used by the applications 1420 and/or other software modules. For example, the frameworks 1418 may provide various graphic user interface (GUI) functions, high-level resource management, or high-level location services. The frameworks 1418 may provide a broad spectrum of other APIs for applications 1420 and/or other software modules.

The applications 1420 include built-in applications 1440 and/or third-party applications 1442. Examples of built-in applications 1440 may include, but are not limited to, a contacts application, a browser application, a location application, a media application, a messaging application, and/or a game application. Third-party applications 1442 may include any applications developed by an entity other than the vendor of the particular platform. The applications 1420 may use functions available via OS 1414, libraries 1416, frameworks 1418, and presentation layer 1444 to create user interfaces to interact with users.

Some software architectures use virtual machines, as illustrated by a virtual machine 1448. The virtual machine 1448 provides an execution environment where applications/modules can execute as if they were executing on a hardware machine (such as the machine 1000 of FIG. 10, for example). The virtual machine 1448 may be hosted by a host OS (for example, OS 1414) or hypervisor, and may have a virtual machine monitor 1446 which manages operation of the virtual machine 1448 and interoperation with the host operating system. A software architecture, which may be different from software architecture 1402 outside of the virtual machine, executes within the virtual machine 1448 such as an OS 1450, libraries 1452, frameworks 1454, applications 1456, and/or a presentation layer 1458.

Figure 15:
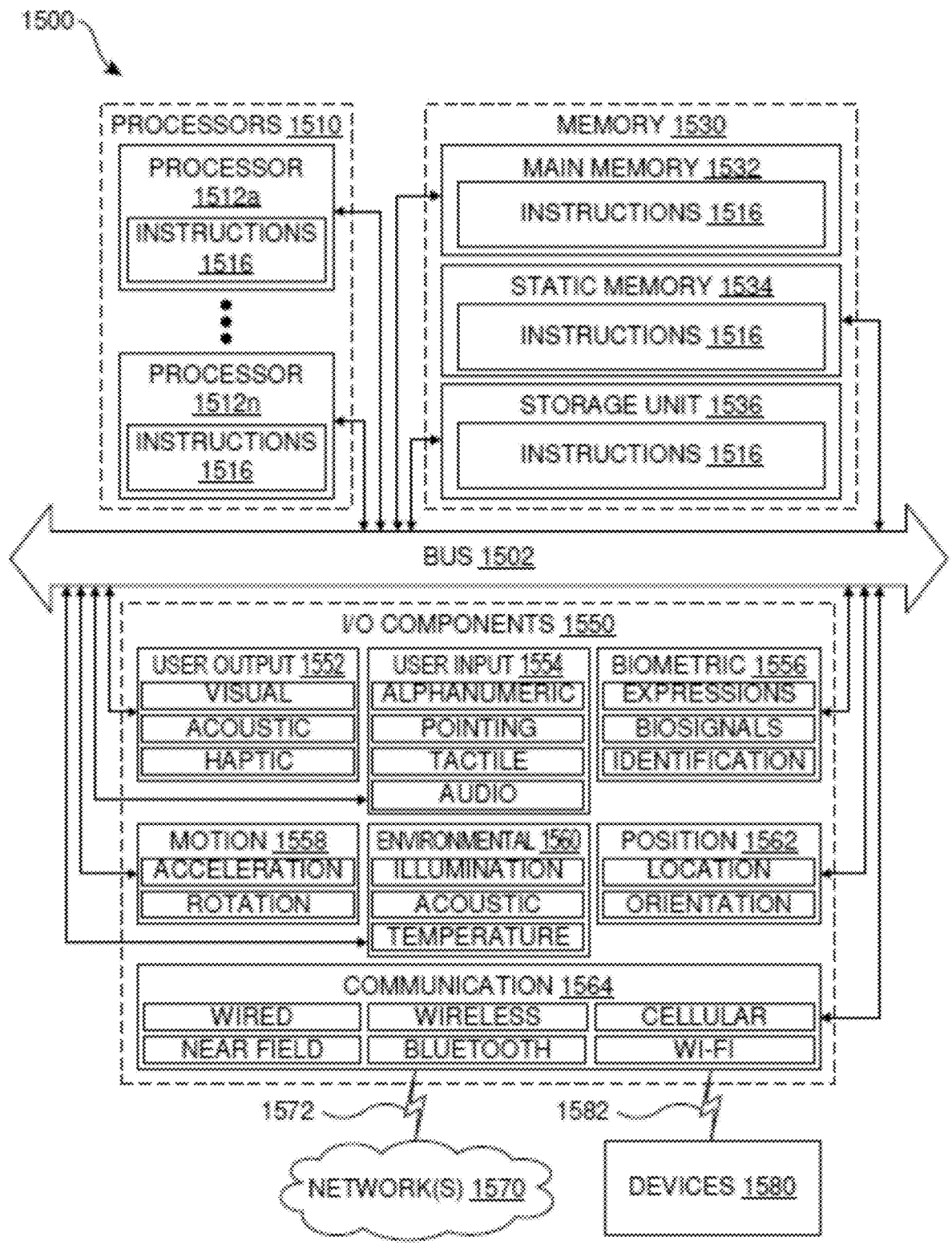
FIG. 15 is a block diagram illustrating components of an example machine configured to read instructions from a machine-readable medium.

FIG. 15 is a block diagram illustrating components of an example machine 1500 configured to read instructions from a machine-readable medium (for example, a machine-readable storage medium) and perform any of the features described herein. The example machine 1500 is in a form of a computer system, within which instructions 1516 (for example, in the form of software components) for causing the machine 1500 to perform any of the features described herein may be executed. As such, the instructions 1516 may be used to implement modules or components described herein. The instructions 1516 cause unprogrammed and/or unconfigured machine 1500 to operate as a particular machine configured to carry out the described features. The machine 1500 may be configured to operate as a standalone device or may be coupled (for example, networked) to other machines. In a networked deployment, the machine 1500 may operate in the capacity of a server machine or a client machine in a server-client network environment, or as a node in a peer-to-peer or distributed network environment. Machine 1500 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1500 is illustrated, the term "machine" includes a collection of machines that individually or jointly execute the instructions 1516.

The machine 1500 may include processors 1510, memory 1530, and I/O components 1550, which may be communicatively coupled via, for example, a bus 1502. The bus 1502 may include multiple buses coupling various elements of machine 1500 via various bus technologies and protocols. In an example, the processors 1510 (including, for example, a central processing unit (CPU), a graphics processing unit (GPU), a digital signal processor (DSP), an ASIC, or a suitable combination thereof) may include one or more processors 1512a to 1512n that may execute the instructions 1516 and process data. In some examples, one or more processors 1510 may execute instructions provided or identified by one or more other processors 1510. The term "processor" includes a multi-core processor including cores that may execute instructions contemporaneously. Although FIG. 15 shows multiple processors, the machine 1500 may include a single processor with a single core, a single processor with multiple cores (for example, a multi-core processor), multiple processors each with a single core, multiple processors each with multiple cores, or any combination thereof. In some examples, the machine 1500 may include multiple processors distributed among multiple machines.

The memory/storage 1530 may include a main memory 1532, a static memory 1534, or other memory, and a storage unit 1536, both accessible to the processors 1510 such as via the bus 1502. The storage unit 1536 and memory 1532, 1534 store instructions 1516 embodying any one or more of the functions described herein. The memory/storage 1530 may also store temporary, intermediate, and/or long-term data for processors 1510. The instructions 1516 may also reside, completely or partially, within the memory 1532, 1534, within the storage unit 1536, within at least one of the processors 1510 (for example, within a command buffer or cache memory), within memory at least one of I/O components 1550, or any suitable combination thereof, during execution thereof. Accordingly, the memory 1532, 1534, the storage unit 1536, memory in processors 1510, and memory in I/O components 1550 are examples of machine-readable media.

As used herein, "machine-readable medium" refers to a device able to temporarily or permanently store instructions and data that cause machine 1500 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1516) for execution by a machine 1500 such that the instructions, when executed by one or more processors 1510 of the machine 1500, cause the machine 1500 to perform and one or more of the features described herein. Accordingly, a "machine-readable medium" may refer to a single storage device, as well as "cloud-based" storage systems or storage networks that include multiple storage apparatus or devices.

The I/O components 1550 may include a wide variety of hardware components adapted to receive input, provide output, produce output, transmit information, exchange information, capture measurements, and so on. The specific I/O components 1550 included in a particular machine will depend on the type and/or function of the machine. For example, mobile devices such as mobile phones may include a touch input device, whereas a headless server or IoT device may not include such a touch input device. The particular examples of I/O components illustrated in FIG. 15 are in no way limiting, and other types of components may be included in machine 1500. The grouping of I/O components 1550 are merely for simplifying this discussion, and the grouping is in no way limiting. In various examples, the I/O components 1550 may include user output components 1552 and user input components 1554. User output components 1552 may include, for example, display components for displaying information (for example, a liquid crystal display (LCD) or a projector), acoustic components (for example, speakers), haptic components (for example, a vibratory motor or force-feedback device), and/or other signal generators. User input components 1554 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1550 may include biometric components 1556 and/or position components 1562, among a wide array of other environmental sensor components. The biometric components 1556 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1562 may include, for example, location sensors (for example, a Global Position System (GPS) receiver), altitude sensors (for example, an air pressure sensor from which altitude may be derived), and/or orientation sensors (for example, magnetometers).

The I/O components 1550 may include communication components 1564, implementing a wide variety of technologies operable to couple the machine 1500 to network(s) 1570 and/or device(s) 1580 via respective communicative couplings 1572 and 1582. The communication components 1564 may include one or more network interface components or other suitable devices to interface with the network(s) 1570. The communication components 1564 may include, for example, components adapted to provide wired communication, wireless communication, cellular communication, Near Field Communication (NFC), Bluetooth communication, Wi-Fi, and/or communication via other modalities. The device(s) 1580 may include other machines or various peripheral devices (for example, coupled via USB).

In some examples, the communication components 1564 may detect identifiers or include components adapted to detect identifiers. For example, the communication components 1564 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1562, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A data processing system comprising:
at least one processor; and
one or more computer readable media including instructions which, when executed by the at least one processor, cause the at least one processor to:
receive over a communication network a first request to associate a first tag of a plurality of different tags with first electronic content, wherein each tag of the plurality of tags is:
configured to label electronic content, and
associated with a respective task from among a plurality of tasks;
record, in response to receiving the first request, a first association between the first electronic content and the first tag; and
transmit over the communication network to a first recipient client:
the first electronic content, and
an instruction to the first recipient client to cause the first recipient client to execute, in response to receiving the first electronic content, the respective task associated with the first tag on the first electronic content.

2. The data processing system of claim 1, wherein the instructions further cause the at least one processor to:
cause to be presented, on a first client device, a first user interface for a content viewing application, the first user interface including an annotation menu that includes the plurality of tags, and
wherein the first request results from a selection of the first tag from the annotation menu of the first user interface.

3. The data processing system of claim 2, wherein the instructions further cause the at least one processor to:
automatically analyze the first electronic content to identify one or more characters, symbols, or both including the first electronic content associated with the first tag at one or more locations within the first electronic content; and
automatically associate the first tag with the one or more locations within the first electronic content.

4. The data processing system of claim 2, wherein the instructions further cause the at least one processor to:
automatically analyze the first electronic content to identify one or more characters, symbols, or both including the first electronic content associated with the first tag at one or more locations within the first electronic content;
cause to be presented, on the first client device, the one or more locations within the first electronic content;
receive a second request, from the first client device, to associate the first tag with a selected location from among the one or more locations; and
record, in response to receiving the second request, a second association between the first tag and the selected location.

5. The data processing system of claim 1, wherein the instructions further cause the at least one processor to:
cause to be presented, on a first client device, a first user interface for a content viewing application, the first user interface including a customization menu for customizing tags from among the plurality of tags;
receive, from the first client device, a second request to associate a second tag of the plurality of tags with a second task from among the plurality of tasks; and
record, in response to receiving the second request, a second association between the second tag and the second task in a tag repository maintained by the data processing system.

6. The data processing system of claim 5, wherein the instructions further cause the at least one processor to:
receive, from the first client device, over the communication network a third request to associate the second tag with second electronic content; and
record, in response to receiving the second request, a third association between the second electronic content and the second tag.

7. The data processing system of claim 6, wherein the instructions further cause the at least one processor to:
transmit over the communication network to a second recipient client:
the second electronic content, and
an instruction to the second recipient client to cause the second recipient client to execute, in response to receiving the second electronic content, the second task on the second electronic content.

8. A method for annotating electronic content items, the method comprising:
receiving over a communication network a first request to associate a first tag from among a plurality different of tags with first electronic content, wherein each tag from among the plurality of tags is:
    configured to label electronic content, and
    associated with a respective task from among a plurality of tasks;
recording, in response to receiving the first request, a first association between the first electronic content and the first tag; and
transmitting over the communication network to a first recipient client:
    the first electronic content, and
    an instruction to the first recipient client to cause the first recipient client to execute, in response to receiving the first electronic content, the respective task associated with the first tag on the first electronic content.

9. The method of claim 8, further comprising:
causing to be presented, on a first client device, a first user interface for a content viewing application, the first user interface including an annotation menu that includes the plurality of tags, and
wherein the first request results from a selection of the first tag from the annotation menu of the first user interface.

10. The method of claim 9, further comprising:
automatically analyzing the first electronic content to identify one or more characters, symbols, or both including the first electronic content associated with the first tag at one or more locations within the first electronic content; and
automatically associating the first tag with the one or more locations within the first electronic content.

11. The method of claim 9, further comprising:
automatically analyzing the first electronic content to identify one or more characters, symbols, or both including the first electronic content associated with the first tag at one or more locations within the first electronic content;
causing to be presented, on the first client device, the one or more locations within the first electronic content;
receiving a second request, from the first client device, to associate the first tag with a selected location of the one or more locations; and
recording, in response to receiving the second request, a second association between the first tag and the selected location.

12. The method of claim 8, further comprising:
causing to be presented, on a first client device, a first user interface for a content viewing application, the first user interface including a customization menu for customizing tags of the plurality of tags;
receiving, from the first client device, a second request to associate a second tag of the plurality of tags with a second task of the plurality of tasks; and
recording, in response to receiving the second request, a second association between the second tag and the second task in a tag repository.

13. The method of claim 12, further comprising:
receiving, from the first client device, over the communication network a third request to associate the second tag with second electronic content; and
recording, in response to receiving the second request, a third association between the second electronic content and the second tag.

14. The method of claim 13, further comprising:
transmitting over the communication network to a second recipient client:
    the second electronic content, and
    an instruction to the second recipient client to cause the second recipient client to execute, in response to receiving the second electronic content, the second task on the second electronic content.

15. A computer-readable storage medium on which are stored instructions that, when executed, cause a processor of a programmable device to perform operations of:
receiving over a communication network a first request to associate a first tag from among a plurality of different tags with first electronic content, wherein each tag from among the plurality of tags is:
    configured to label electronic content, and
    associated with a respective task of a plurality of different tasks;
recording, in response to receiving the first request, an association between the first electronic content and the first tag; and
transmitting over the communication network to a first recipient client:
    the first electronic content, and
    an instruction to the first recipient client to cause the first recipient client to execute, in response to receiving the first electronic content, the respective task associated with the first tag on the first electronic content.

16. The computer-readable storage medium of claim 15, wherein the instructions further cause the processor of the programmable device to perform operations of:
causing to be presented, on a first client device, a first user interface for a content viewing application, the first user interface including an annotation menu that includes the plurality of tags, and
wherein the first request results from a selection of the first tag from the annotation menu of the first user interface.

17. The computer-readable storage medium of claim 16, wherein the instructions further cause the processor of the programmable device to perform operations of:
automatically analyzing the first electronic content to identify one or more characters, symbols, or both including the first electronic content associated with the first tag at one or more locations within the first electronic content; and
automatically associating the first tag with the one or more locations within the first electronic content.

18. The computer-readable storage medium of claim 16, wherein the instructions further cause the processor of the programmable device to perform operations of:
automatically analyzing the first electronic content to identify one or more characters, symbols, or both including the first electronic content associated with the first tag at one or more locations within the first electronic content;
causing to be presented, on the first client device, the one or more locations within the first electronic content;
receiving a second request, from the first user device, to associate the first tag with a selected location of the one or more locations; and
recording, in response to receiving the second request, a second association between the first tag and the selected location.

19. The computer-readable storage medium of claim 15, wherein the instructions further cause the processor of the programmable device to perform operations of:
causing to be presented, on a first client device, a first user interface for a content viewing application, the first user interface including a customization menu for customizing tags from among the plurality of tags;
receiving, from the first client device, a second request to associate a second tag of the plurality of tags with a second task from among the plurality of tasks; and
recording, in response to receiving the second request, a second association between the second tag and the second task in a tag repository.

20. The computer-readable storage medium of claim 19, wherein the instructions further cause the processor of the programmable device to perform operations of: receiving, from the first client device, over the communication network a third request to associate the second tag with second electronic content; and recording, in response to receiving the second request, a third association between the second electronic content and the second tag.

* * * * *